United States Patent
Yadavali et al.

(10) Patent No.: US 12,443,417 B2
(45) Date of Patent: Oct. 14, 2025

(54) ORCHESTRATING MULTIPLE RUNTIME ENGINES IN SINGLE ENVIRONMENT, INVOLVES EXECUTING SECOND RUNTIME ENGINE SIMULTANEOUSLY WITH FIRST RUNTIME ENGINE TO GENERATE DASHBOARD GRAPHICAL USER INTERFACE

(71) Applicant: Salesforce, Inc., San Francisco, CA (US)

(72) Inventors: Niranjan Yadavali, San Francisco, CA (US); Sandeep Rawat, San Francisco, CA (US); Shyamak Aggarwal, San Francisco, CA (US); Zemene Tsegaye, Bellevue, WA (US); Lingzhi Xu, San Francisco, CA (US)

(73) Assignee: Salesforce, Inc., San Francisco, CA (US)

(*) Notice: Subject to any disclaimer, the term of this patent is extended or adjusted under 35 U.S.C. 154(b) by 733 days.

(21) Appl. No.: 17/649,498

(22) Filed: Jan. 31, 2022

(65) Prior Publication Data
US 2023/0244520 A1    Aug. 3, 2023

(51) Int. Cl.
*G06F 9/48* (2006.01)
*G06F 9/445* (2018.01)
*G06F 9/451* (2018.01)
*G06F 9/54* (2006.01)

(52) U.S. Cl.
CPC .......... *G06F 9/44505* (2013.01); *G06F 9/451* (2018.02); *G06F 9/542* (2013.01)

(58) Field of Classification Search
CPC ....... G06F 9/44505; G06F 9/451; G06F 9/542
USPC ............................................................ 713/1
See application file for complete search history.

(56) References Cited

U.S. PATENT DOCUMENTS

| | | | |
|---|---|---|---|
| 8,468,545 B2 * | 6/2013 | Townsend | G06F 16/93 719/313 |
| 9,052,817 B2 * | 6/2015 | Hotelling | G06F 3/04883 |
| 10,852,926 B2 | 12/2020 | Zheng et al. | |
| 11,054,971 B2 | 7/2021 | Zheng et al. | |
| 12,164,497 B1 * | 12/2024 | Garg | G06F 16/26 |
| 2015/0019480 A1 * | 1/2015 | Maquaire | G06F 16/2365 707/609 |
| 2018/0341388 A1 | 11/2018 | Zheng et al. | |

* cited by examiner

*Primary Examiner* — Tammara R Peyton
(74) *Attorney, Agent, or Firm* — Kwan & Olynick LLP

(57) ABSTRACT

Disclosed are some implementations of systems, apparatus, methods and computer program products for implementing multiple runtime engines in a single environment to generate a dashboard GUI including multiple dashboard components.

20 Claims, 10 Drawing Sheets

```
                                                          450
                                                       ↙

{
  "id":"0FKEE000000k4734AA",
  "label": "Asset name",

{"component_1": {
      "parameters": {
          "pageName": 372a520a-c74c",
          "state": false,
          "source": {
              "name": "SiloedOrchestrestrationComponent1",
              "type": "component"
          }

"component_2": {
      "parameters": {
          "pageName": 372a520a-c74c",
          "state": true,
          "source": {
              "name": "SharedOrchestrestrationComponent1",
              "type": "component"
          }

"component_3": {
      "parameters": {
          "state": true,
          "source": {
              "name": "TooltipComponent,
              "type": "component"
          }
    .
    .
}
```

*Figure 4B*

ORCHESTRATING MULTIPLE RUNTIME ENGINES IN SINGLE ENVIRONMENT, INVOLVES EXECUTING SECOND RUNTIME ENGINE SIMULTANEOUSLY WITH FIRST RUNTIME ENGINE TO GENERATE DASHBOARD GRAPHICAL USER INTERFACE

COPYRIGHT NOTICE

A portion of the disclosure of this patent document contains material, which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

This patent document generally relates to systems and techniques for orchestrating multiple runtime engines in a single environment. More specifically, this patent document discloses techniques for orchestrating multiple runtime engines corresponding to different portions of a single dashboard graphical user interface (GUI).

BACKGROUND

A dashboard is a type of graphical user interface (GUI) that can provide data visualization in the form of a report. In some instances, the data visualization can provide a view of key performance indicators (KPI) relevant to a particular objective or process. Typically, a dashboard provides a single report and is presented via a single screen.

A dashboard is often accessible by a web browser. Generally, the data visualization is generated using data retrieved from data sources that are regularly updated. Therefore, the dashboard is a valuable tool that can be used to present a consolidated view of information for a variety of purposes.

BRIEF DESCRIPTION OF THE DRAWINGS

The included drawings are for illustrative purposes and serve only to provide examples of possible structures and operations for the disclosed systems, apparatus, methods and computer program products for facilitating implementation of a componentized dashboard using multiple runtime engines. These drawings in no way limit any changes in form and detail that may be made by one skilled in the art without departing from the spirit and scope of the disclosed implementations.

FIG. 4B shows an example of dashboard metadata, in accordance with some implementations.

DETAILED DESCRIPTION

Figure 1:
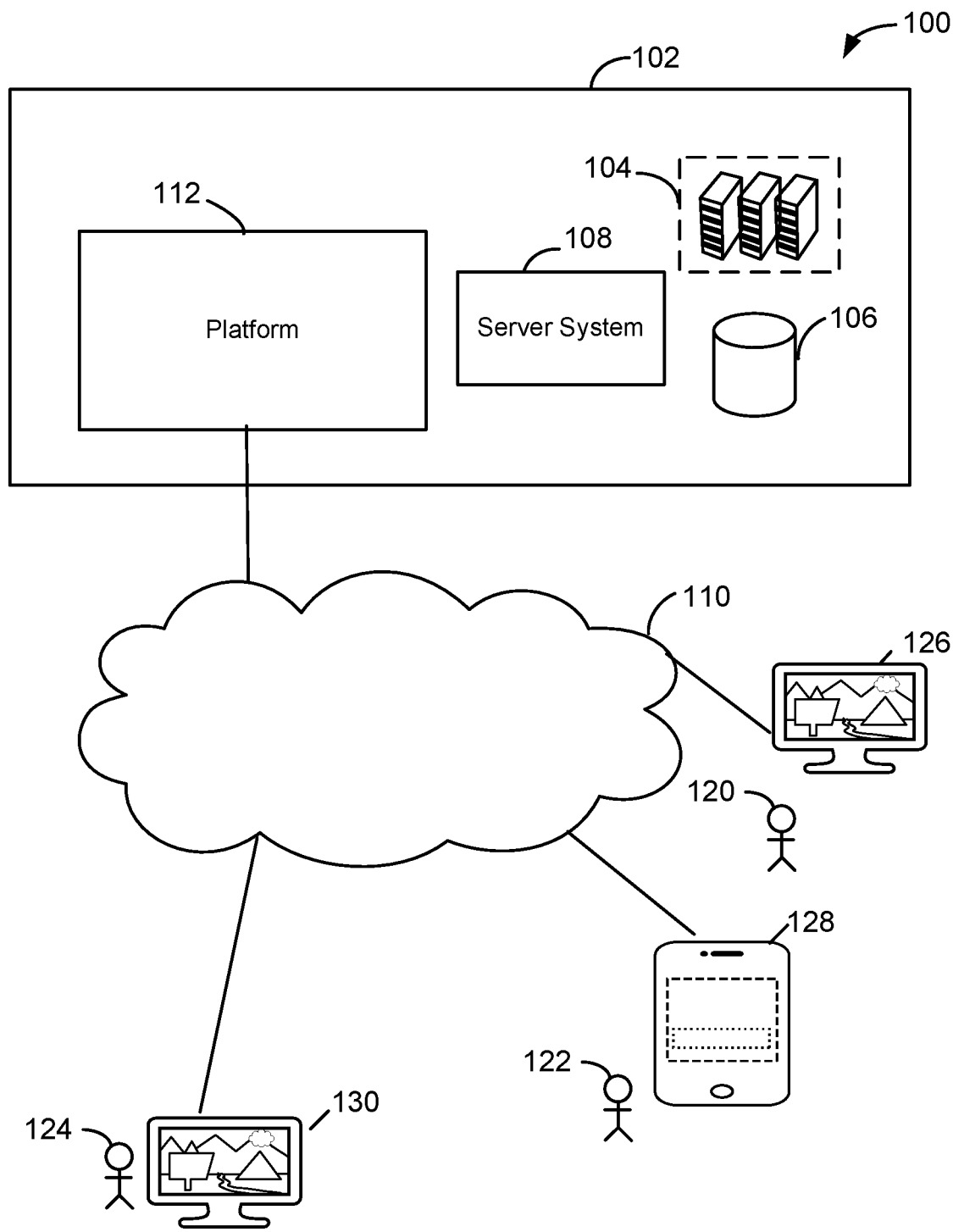
FIG. 1 shows a system diagram of an example of a system 100 configured to facilitate the rendering of a componentized dashboard, in accordance with some implementations.

Examples of systems, apparatus, methods and computer program products according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the operations of methods shown and described herein are not necessarily performed in the order indicated. It should also be understood that the methods may include more or fewer operations than are indicated. In some implementations, operations described herein as separate operations may be combined. Conversely, what may be described herein as a single operation may be implemented in multiple operations.

Some implementations of the disclosed systems, apparatus, methods and computer program products are configured to implement multiple runtime engines (i.e., execution engines) that are executed simultaneously to generate a dashboard graphical user interface (GUI), where the runtime engines corresponding to different components of the dashboard GUI.

Today, web documents are accessed via the Internet for a variety of purposes. A web document can include various types of components including, but not limited to, text, images, tabs, and multi-column tables. In addition, web developers have the ability to build and use custom components.

In some instances, a web document can be used to present a dashboard GUI. Typically, a dashboard renders a single screen that presents consolidated information via a single data visualization, which may also be referred to as a report. Examples of reports include, but are not limited to, graphs or charts, such as a line graph, bar chart, donut chart, timeline, geographic map, heat map, tabular chart (e.g., comparison table, pivot table, etc.), and/or other similar views of data.

As users become more engaged with dashboards, the density of information and user control is exponentially increasing. As a result, the demand for the presentation of multiple reports within separate sections of the same dashboard GUI has grown.

In accordance with various implementations, a modular runtime environment is configurable to generate a dashboard GUI that includes two or more sections. Each such section can function as a "mini dashboard" and may be referred to as a dashboard component. For example, a section can correspond to a distinct area (e.g., rectangular region) within the dashboard GUI.

To accommodate the demand of end users for a componentized dashboard GUI, reusable code modules configurable to generate various reusable dashboard components have been developed. In some implementations, a dashboard component can include one or more widgets (e.g., user interface components), which can include a report or other form of graphical user interface element that presents a visualization of data or other information. In addition, a dashboard component can include one or more graphical user interface (GUI) elements (e.g., graphical control elements), where each such GUI element enables a user to interact with the GUI element to initiate a query or otherwise control the visualization of data that is presented within the visualization. Examples of such GUI elements include, but are not limited to, an input text box, a graphical control element (e.g. button, slide, etc.), tab or other user-selectable element, etc. Therefore, each dashboard can include one or more widgets and/or one or more GUI elements.

In response to user interaction with a GUI element of a dashboard component, a query can be generated and executed against one or more data sources. For example, a user may click on one GUI element to view a bar chart presenting consolidated data pertaining to shipping cost for a first shipping mode (e.g., Express Air) or another GUI element to view a bar chart presenting consolidated data pertaining to shipping cost for a second shipping mode (e.g., Regular Air). The query can be executed, for example, against a database and data (or a visualization thereof) that is obtained responsive to the query can be rendered via a widget of the dashboard component.

In accordance with various implementations, each dashboard component is rendered and/or updated via a corresponding runtime engine. In some implementations, each runtime engine operates according to a publish/subscribe model. A publish/subscribe model may be implemented as a topic-based system or as a content-based system. In a topic-based system, messages are published to "topics" or named logical channels and a subscriber receives all messages published to the topics to which they subscribe. In a content-based system, messages are delivered to a subscriber if the attributes or content of those messages matches constraints defined by the subscriber.

In some implementations, data obtained by a "publisher" of the runtime engine from a data source in response to a query can be published via a publish message or publish method of the runtime engine. For example, the data can be published along with metadata identifying the associated event, such as a selected shipping mode indicated by the user interaction with a GUI element of the dashboard component. Similarly, data can be requested by a "subscriber" of the runtime engine for rendering via a widget of the dashboard component. For example, metadata identifying an event for which data is requested can be transmitted via a subscribe message or subscribe method of the runtime engine. A message broker can use the metadata to match data that is published to the subscriber(s) that requested the data and transmit the requested data to the publisher(s).

In the following description, the term "event metadata" refers to metadata that defines an event. In some implementations, the event can identify a topic to which a subscriber is subscribing (or a topic associated with data published by a publisher). In other implementations, the event can identify a set of attributes or characteristics of content to which the subscriber is subscribing (or a set of attributes or characteristics of data published by a publisher). Upon identification of an instance of the event, a message broker sends a message including the data pertaining to the instance of the event to the subscriber.

A subscriber can subscribe to receive specific messages at build time, initialization time, or runtime. In some implementations, a configuration file is implemented to register subscribers and is read at initialization time. In some implementations, a publisher can be added or removed at runtime. A publisher can be configurable to process user commands (e.g., click of a button).

In accordance with various implementations, a client device obtains dashboard metadata. For example, the client device can request the dashboard metadata from a server system in response to selection of a particular dashboard type or identifier by a user. For example, the user can access a web page, link, or tab associated with the desired dashboard type such as "Shipping Costs."

In accordance with various implementations, a runtime orchestration process generates multiple runtime engines using the dashboard metadata and simultaneously executes the runtime engines. More particularly, a runtime orchestration process can obtain and process dashboard metadata to ascertain characteristics of the dashboard components for which runtime engines are to be generated. The runtime orchestration process may determine from the dashboard metadata, for each dashboard component, a state indicating a type of dashboard component or runtime configuration of a corresponding runtime engine.

In some implementations, the dashboard metadata indicates whether a dashboard component operates independently from other dashboard components or shares information with other dashboard component(s). For example, the dashboard metadata may indicate whether a state of a dashboard component is shared or siloed. A dashboard component that is operating independently may be referred to as a siloed dashboard component while a dashboard component that shares information with other dashboard component(s) may be referred to as a shared dashboard component.

In some implementations, the runtime orchestration process instantiates a parent runtime engine corresponding to a parent dashboard component, which may be identified from the dashboard metadata. In addition, the runtime orchestration process instantiates, for each child dashboard component identified in the dashboard metadata, a corresponding child runtime engine according to the state of the child dashboard component. A child runtime engine that operates in a shared state may be referred to as a shared child runtime engine while a child runtime engine that operates in siloed state may be referred to as a siloed child runtime engine.

Upon initiating execution of the parent and child runtime engines, the parent and child runtime engines execute simultaneously to render and update a dashboard GUI according to user interaction with the dashboard GUI. During execution of the runtime engines, a shared child runtime engine and parent runtime information may communicate to share information, enabling the corresponding components of the dashboard GUI to be updated in a consistent manner. More particularly, the parent runtime engine and shared child runtime engine can communicate via a publish/subscribe model, as supported by publish/subscribe methods of the parent and shared child runtime engines.

In some implementations, a shared child runtime engine is instantiated with a namespace and an argument including an instance of the parent runtime engine. In other words, the shared child runtime engine may be generated, using a namespace, by instantiating a wrapper class with an argument of the wrapper class including the instance of the parent runtime engine. During runtime, since the shared child runtime engine operates as a wrapper, calls to its own methods actually result in calls to corresponding methods of the parent runtime engine. Therefore, information may be efficiently shared across the parent runtime engine and shared runtime engines through the parent runtime engine's methods.

FIG. 1 shows a system diagram of an example of a system 100 configured to facilitate the rendering of a componentized dashboard, in accordance with some implementations. Database system 102 includes a variety of different hardware and/or software components that are in communication with each other. In the non-limiting example of FIG. 1, system 102 includes any number of computing devices such as servers 104. Servers 104 can include one or more web servers configurable to execute web applications. Servers 104 are in communication with one or more storage mediums 106 configured to store and maintain relevant data and/or metadata used to perform some of the techniques disclosed herein, as well as to store and maintain relevant data and/or metadata generated by the techniques disclosed herein. Storage mediums 106 may further store computer-readable instructions configured to perform some of the techniques described herein. Storage mediums 106 can also store user accounts/user profiles of users of system 100, as well as database records such as customer relationship management (CRM) records.

System 102 includes server system 108, as described herein. More particularly, server system 108 supports the generation and display of a dashboard GUI by client devices, as described herein. In some implementations, server system 108 supports the generation of web documents, which can include data retrieved from one or more database records.

In some implementations, system 102 is configured to store user profiles/user accounts associated with users of system 102. Information maintained in a user profile of a user can include a client identifier such an Internet Protocol (IP) address or Media Access Control (MAC) address. In addition, the information can include a unique user identifier such as an alpha-numerical identifier, the user's name, a user email address, and credentials of the user. Credentials of the user can include a username and password. The information can further include job related information such as a job title, role, group, department, organization, and/or experience level, as well as any associated permissions. Profile information such as job related information and any associated permissions can be applied by system 102 to manage access to web applications or services such as those described herein.

Client devices 126, 128, 130 may be in communication with system 102 via network 110. More particularly, client devices 126, 128, 130 may communicate with server system 108 via network 110. For example, network 110 can be the Internet. In another example, network 110 comprises one or more local area networks (LAN) in communication with one or more wide area networks (WAN) such as the Internet.

Embodiments described herein are often implemented in a cloud computing environment, in which network 110, servers 104, and possible additional apparatus and systems such as multi-tenant databases may all be considered part of the "cloud." Servers 104 may be associated with a network domain, such as www.salesforce.com and may be controlled by a data provider associated with the network domain. In this example, employee users 120, 122, 124 of client computing devices 126, 128, 130 have accounts at salesforce.com®. By logging into their accounts, users 126, 128, 130 can access the various services and data provided by system 102 to employees. In other implementations, users 120, 122, 124 need not be employees of salesforce.com® or log into accounts to access services and data provided by system 102. Examples of devices used by users include, but are not limited to, a desktop computer or portable electronic device such as a smartphone, a tablet, a laptop, a wearable device such as Google Glass®, another optical head-mounted display (OHMD) device, a smart watch, etc.

In some implementations, users 120, 122, 124 of client devices 126, 128, 130 can access services provided by system 102 via platform 112 or an application installed on client devices 126, 128, 130. More particularly, client devices 126, 128, 130 can log into system 102 via an application programming interface (API) or via a graphical user interface (GUI) using credentials of corresponding users 120, 122, 124 respectively. Client devices 126, 128, 130 can communicate with system 102 via platform 112. Communications between client devices 126, 128, 130 and system 102 can be initiated by a user 120, 122, 124. Alternatively, communications can be initiated by system 102 and/or application(s) installed on client devices 126, 128, 130. Therefore, communications between client devices 126, 128, 130 and system 102 can be initiated automatically or responsive to a user request.

A web application executing via system 102 can generate web documents. Client devices 126, 128, 130 can access the web application and web documents via platform 112.

Some implementations may also be practiced in distributed computing environments where tasks are performed by remote processing devices that are linked through a communications network. In a distributed computing environment, program modules may be located in local and/or remote computer storage media including memory storage devices.

Some implementations may be described in the general context of computing system executable instructions, such as program modules, being executed by a computer. The disclosed implementations may further include objects, data structures, and/or metadata, which may facilitate the implementation of multiple runtime engines, as described herein.

In accordance with various implementations, the modular runtime environment may be executed within an application container or web browser of a computing device. In this regard, the modular runtime environment may execute programs/scripts and may render markup language documents (e.g., Hypertext Markup Language (HTML), Extensible Markup Language (XML), JavaScript Object Notation (JSON), etc.) and other content. The programs/scripts may be written in a client-side scripting language, such as JavaScript, Jscript, Ruby, Python, etc.

In accordance with various implementations, a user can access a dashboard GUI via a web browser of a computing device. The client device may render the dashboard GUI using information received from a server system, as will be described in further detail below.

Figure 2:
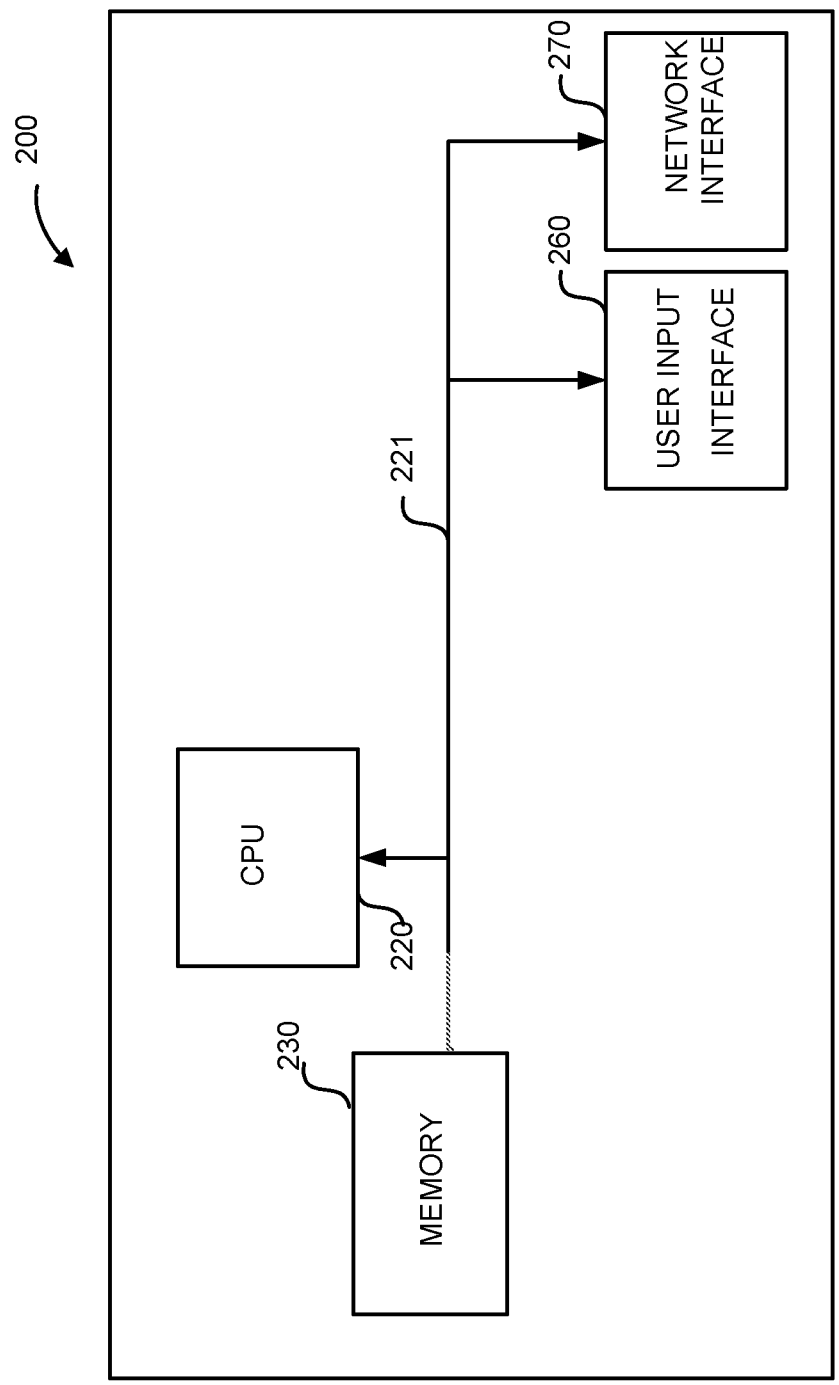
FIG. 2 is a diagram of an example computing system 200 that may be used with some implementations.

A computing device that operates as a server or client device may be implemented via any suitable computing system. FIG. 2 is a diagram of an example computing system 200 that may be used with some implementations. Computing system 200 may include a central processing unit (CPU) 230 having one or more processing cores and a memory 230. In addition, computing system 200 may include a system bus 221 that couples with various system components including the memory 230 and CPU(s) 220.

In some implementations, computing system 200 includes a variety of computer program products. A computer program product can be any available media that can be accessed by computing system 200 including, but not limited to, volatile and nonvolatile media, removable and non-removable media. A computer program product may store information such as computer readable instructions, data structures, or other data such as that described herein.

Memory 230 may include read only memory (ROM)) and/or random-access memory (RAM). In some implementations, memory 230 stores computer readable instructions, data structures, and/or data, which may be generated or processed as described herein.

In some implementations, a user may interact with the computing system 200 through an input device such as a keyboard, a microphone, a remote control, and/or a pointing device such as a mouse, touch pad, or touch screen. These and other input devices may be connected to the CPU 220 through a user input interface 260. Alternatively, an input device may be connected to computing system 200 by another interface such as a universal serial bus (USB) port or wireless interface.

Computing system 200 may operate in a networked environment via which it may connect to a system such as that described above with reference to FIG. 1. Computing system 200 may be connected to a local or wide area network through a network interface or adapter 270.

A web browser of computing system 200 can implement multiple runtime engines to generate and render a dashboard GUI, as described herein. In some implementations, a runtime engine functions as an intermediary between a user interface and a rendering engine. More particularly, the runtime engine may process queries and interact with the rendering engine according to inputs received via the user interface.

Figure 3:
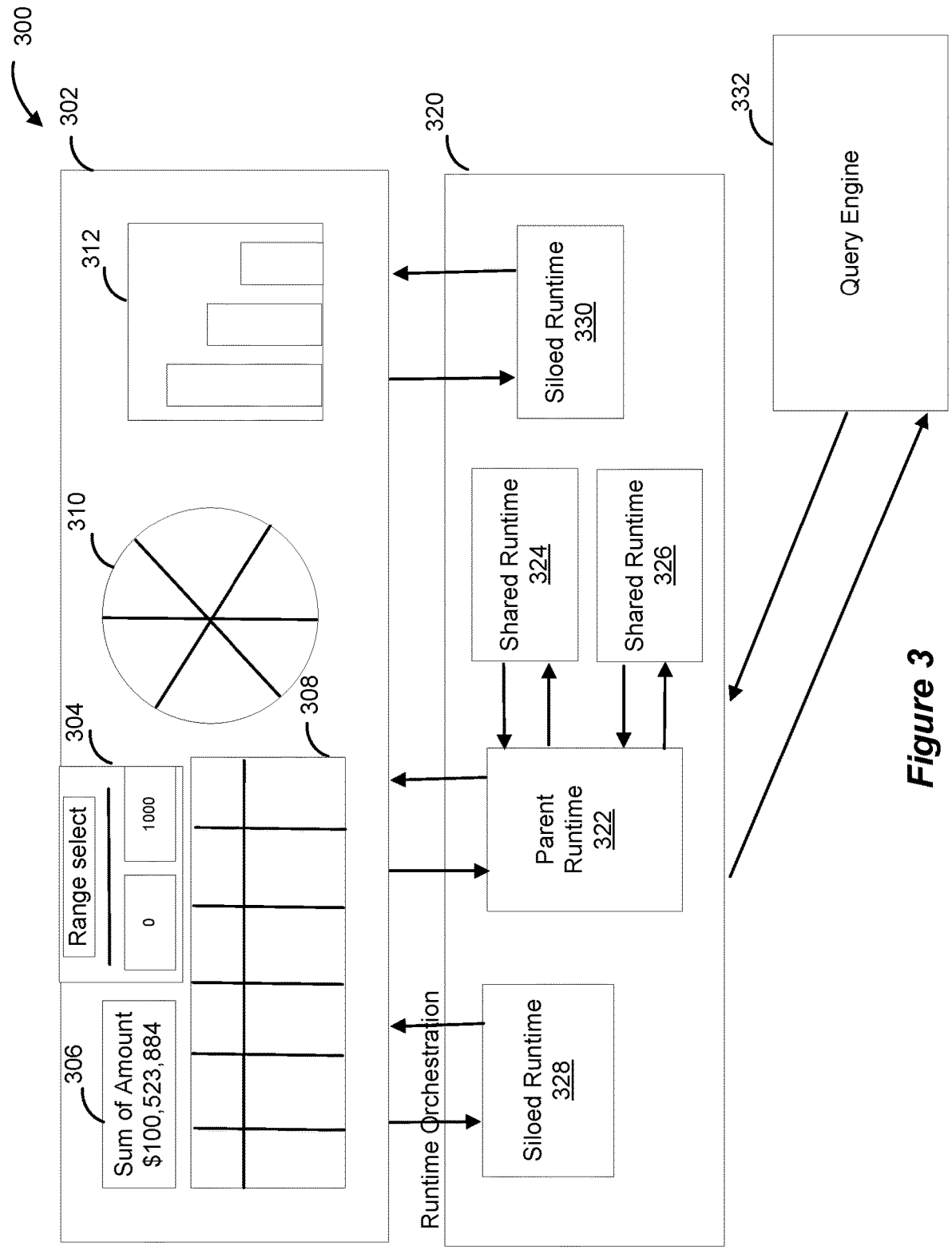
FIG. 3 shows an example runtime environment 300 in which a dashboard graphical user interface (GUI) having multiple dashboard components is rendered, in accordance with some implementations.

FIG. 3 shows an example runtime environment 300 in which a dashboard graphical user interface (GUI) having multiple dashboard components is rendered, in accordance with some implementations. As shown in this example, runtime environment 300 enables a dashboard GUI 302 including multiple components 304, 306, 308, 310, 312 to be rendered by a display via a client device implementing a runtime orchestration layer 304. Runtime orchestration layer 320 manages the instantiation of multiple runtime engines 322, 324, 326, 328, 330 that can be executed simultaneously, where each runtime engine is configurable to generate, update, or otherwise communicate with a corresponding one of components 304, 306, 308, 310, 312. As will be described in further detail below, a runtime engine may be configurable to process subscribe messages received from subscribers and publish messages received from publishers, and transmit data published by publishers to subscribers based upon the events to which the subscribers have subscribed.

In some implementations, publishers and subscribers can detect one another, for example, via multicast messages. In such systems, publishers and subscribers and communicate directly with one another. In other implementations, a message broker of a runtime engine can track messages transmitted by subscribers and publishers, map information transmitted by the publishers to events to which subscribers have subscribed, and transmit the information to subscribers according to a result of the mapping, as appropriate. Example implementations of a publish-subscribe model will be described in further detail below.

In accordance with various implementations, a runtime engine may operate according to component metadata associated with the component that the runtime engine is responsible for generating or updating. As will be described in further detail below, the component metadata can include a state that indicates a runtime configuration of the runtime engine.

The state can indicate whether the corresponding component that is generated is to operate independently from other components or, alternatively, whether the corresponding component is to share information with other component(s). Thus, the state can indicate whether the corresponding runtime engine is to operate independently from other runtime engines or to share messages with other runtime engine(s).

In some implementations, a runtime engine is configurable to operate as a parent runtime engine or a child runtime engine. A parent runtime engine is configurable to share messages with child runtime engines (e.g., runtime engines operating in a shared state). Similarly, a child runtime engine operating in a shared state is configurable to share messages with the parent runtime engine. Those child runtime engines operating in a siloed (e.g., independent) state do not share messages with the parent runtime engine or other child runtime engines.

A dashboard component can include one or more graphical user interface (GUI) elements, where each such GUI element enables a user to interact with the GUI element to initiate a query. Examples of such GUI elements include, but are not limited to, an input text box, a graphical control element (e.g. button, slide, selection element, etc.), tab or other user-selectable element, etc. In addition, a dashboard component can include one or more widgets, which can include a report or other form of graphical user interface element that presents a visualization of data or other information. For a given dashboard component, data retrieved in response to a query can be used to generate or otherwise update a widget of the dashboard component. Therefore, a widget of a dashboard component may be powered by one or more queries.

As will be described in further detail below, a runtime engine is configurable to communicate with widget(s) within a dashboard component, as well as with GUI element(s) of the dashboard component.

In accordance with various implementations, a modular runtime environment implements a publish-subscribe model. More particularly, a runtime engine includes a subscribe method, which may be accessed via a corresponding API of the runtime engine. In addition, the runtime engine includes a publish method, which may be accessed via a corresponding API of the runtime engine.

A subscriber can include code configured to transmit a subscribe message via a subscribe method of a runtime engine. In some implementations, a subscriber can transmit a subscribe message specifying an event defining data that is requested. In addition, the subscribe message can identify the subscriber.

Similarly, a publisher can include code configured to transmit a publish message via a publish method of a runtime engine. A publisher may be configured to publish data associated with a particular event (e.g., topic or data characteristics). For example, the publisher can transmit a message that includes the data and identifies the event.

To obtain data to render via a widget or other GUI element of a dashboard component, a widget application (e.g., computer-readable instructions) configured to generate the widget/GUI element may operate as a subscriber by calling a subscribe method of the runtime engine corresponding to the dashboard component. A subscriber may subscribe to a particular event, where the event defines characteristics of data that is requested by the subscriber. In other words, the event can specify a topic or criteria for which data is requested. In this manner, the subscriber can send a subscribe message that specifies the event for which data is requested. A single runtime can include one or more subscribers.

In some implementations, a runtime engine includes a publisher that includes code responsible for obtaining data (e.g., database objects or data values) and publishing the obtained data. For example, a publisher may be responsible for obtaining data in response to a query indicated by a user interaction with a GUI element of the dashboard component, such as the selection of a shipping mode or specification of a particular data range. The publisher may query one or more data sources (e.g., databases) to obtain data. Once obtained, the publisher can "publish" the data, as described herein. A publisher of the runtime engine may also be referred to as a "query lens." A single runtime engine can include one or more publishers.

In some implementations, a publisher of a runtime engine can transmit a query to a query engine 332, which is configured to query one or more data sources (e.g., databases) for data items according to a received query. For example, the data sources can include one or more databases. Responsive to receiving a query, query engine 332 can execute a query (e.g., via a query language or script) against one or more data sources or otherwise obtain the requested data (e.g., from local memory or cache, an external API, etc.). Upon executing the query or otherwise obtaining the requested data, query engine 332 can transmit the obtained data to the requesting publisher via a message in response to the query. For example, query engine 332 may transmit the obtained data to the publisher of the runtime engine that has transmitted the query. In this manner, a publisher of a runtime engine may obtain data from databases, which may be internal or external to the database system.

In this example, parent runtime engine 322 is configured to generate and/or update parent component 304, which includes one or more GUI elements such as a range selection element or input text box(es). For example, a user can interact with range selection element or input text via input text boxes to select a range of values. In response, a publisher of parent runtime engine 322 can transmit a query indicating the selected range of values to query engine 332, which transmits the requested data to the publisher in response to the query. The publisher can then publish the data it has obtained with event metadata identifying an event associated with the data.

In addition, code configured to render a parent widget/GUI element of component 304 may operate as a subscriber to subscribe to receive data associated with a particular event from parent runtime engine 322. A message broker of runtime engine 322 may ascertain the requested event (e.g., criteria or characteristics of requested data) from the subscribe message, obtain the requested data, and transmit the requested data to the subscriber. For example, the message broker can obtain the requested data from a message published by a publisher.

The publisher from which the data has been obtained and provided by the message broker of parent runtime engine 322 can be a publisher of parent runtime engine 322 or a shared child runtime engine. In addition, a subscriber of a shared child component can subscribe to receive data from parent runtime engine 322. Example implementations of a shared child runtime engine will be described in further detail below.

Shared child runtime engine 324 is configured to generate shared child component 306 and corresponding widget, as shown. Code configured to render a widget of component 306 can operate as a subscriber and transmit a subscribe message via the shared child runtime engine 324 (e.g., via a subscribe method/API of shared child runtime engine 324). In response, shared child runtime engine 324 can transmit a subscribe message to parent runtime engine 322. For example, the subscribe method of shared child runtime engine 324 can call a subscribe method/API of parent runtime engine 322. More particularly, a child runtime engine 324 may operate as a wrapper of parent runtime engine, as will be described in further detail below. As described above, the subscribe message may specify an event (e.g., topic or other criteria) and identify the subscriber.

Upon receiving, obtaining, or otherwise generating data relevant to the event, a message broker of parent runtime engine 322 may transmit the requested data to the subscriber of shared child runtime engine 324. More particularly, the message broker may identify the relevant data from a publish message transmitted by a publisher. For example, a publisher of parent runtime engine 322 may obtain data from query engine 332 in response to its own query and publish the data, enabling parent runtime engine 322 to transmit the data it has received from query engine 332 to a subscriber of shared child runtime engine 324. As another example, a publisher of shared child runtime engine 324 or another shared child runtime engine 326 can cause parent runtime engine 322 to publish data obtained by the publisher of shared child runtime engine 324 or 326. In this manner, data may be shared across runtime engines, enabling different data visualizations to be generated and rendered using the same data.

In addition, a publisher of shared child runtime engine 324 can operate in a similar manner to a publisher of parent runtime engine 322 by obtaining data from query engine 332 and publishing the data it has obtained. More particularly, the publisher of child runtime engine 324 may call a publish method of shared child runtime engine 324. In response, the publish method of shared child runtime engine 324 can transmit a publish message to parent runtime engine 322 (e.g., via a publish method/API of parent runtime engine 322). The publish message may include the data and identify the pertinent event. This data can then be transmitted by the message broker of parent runtime engine 322 to the appropriate subscriber(s) to the event, where the subscribers can include those of parent runtime engine 322 or any of shared child runtime engines 324, 326.

For example, a subscriber of shared child runtime engine 324 may use the data or other information it receives from the message broker of parent runtime engine 322 to generate component 306. In this example, the subscriber of child runtime engine 324 may then render data it receives in the form of a sum or may perform computations on the data to generate the sum, which it renders via component 306.

Similarly, shared child runtime engine 326 is configured to generate and/or update shared child component 308, which includes a widget providing a data visualization such as a representation of a table. Code configured to render a widget of component 308 may operate as a subscriber by calling a subscribe API/method of shared child runtime engine 326. The subscribe method of shared child runtime engine 326 can in turn call the subscribe method/API of parent runtime engine 322. For example, shared child runtime engine 326 may operate as a wrapper of parent runtime engine 322.

In addition, a publisher of shared child runtime engine 326 can call a publish API/method of shared runtime engine 326, which in turn calls the publish API/method of parent runtime engine 322. This enables data obtained by the publisher of shared child runtime engine 326 to be shared with parent runtime engine 322.

Upon receiving, generating, or otherwise obtaining requested data relevant to the event to which the subscriber of child shared runtime engine 326 has subscribed, the message broker of parent runtime engine 322 may transmit the requested data to the subscriber of shared child runtime engine 326. The subscriber of shared child runtime engine 326 may use the data it has received from parent runtime engine 322 to generate component 308. For example, the subscriber of child runtime engine 326 may execute computer-readable instructions to perform computations or other processes on the data to generate component 308.

As shown and described above, in some implementations, since a shared child runtime engine operates as a wrapper of a parent runtime engine, a call to a subscribe method of the shared child runtime engine results in execution of the corresponding subscribe method of the parent runtime engine. In other words, the subscription request is actually processed by the parent runtime engine rather than the shared child runtime engine. Similarly, a call to a publish method of the shared child runtime engine results in execution of the corresponding publish method of the parent runtime engine, causing the publication of the data to be performed by the parent runtime engine rather than the shared child runtime engine. By implementing a shared child runtime engine as a wrapper of the parent runtime engine, the publishers and subscribers of the shared child runtime engine can be distinguished from those of other runtime engines since the shared child runtime engine is instantiated with a unique namespace. As a result, the message broker of parent runtime engine 322 can use data obtained from a publisher of parent runtime engine 322 or a publisher of either of shared child runtime engines 324, 326 to satisfy a subscriber's request for data, regardless of whether the subscriber is a subscriber of parent runtime engine 322 or of one of shared child runtime engines 324, 326.

In contrast, siloed child runtime engines 328, 330 may execute independently without sharing data with other runtime engines. More particularly, each of siloed child runtime engines 328, 330 may implement its own independent message broker. A subscriber of a siloed child runtime engine responsible for generating or updating a corresponding widget of the siloed child component can call a subscribe method/API of the corresponding siloed runtime engine. In addition, a publisher of the siloed runtime engine, responsible for initiating a query in response to user input received via a user input element of the siloed child component, can call a publish method/API of the corresponding siloed runtime engine. The message broker of the siloed runtime engine can then transmit data obtained from a publisher of the siloed child runtime engine to a subscriber of the same siloed child runtime engine.

In this example, a subscriber of siloed child runtime engine 328 may generate or update a corresponding widget (e.g., pie bar chart) of siloed child component 310 based upon data obtained and published by a publisher of siloed child runtime engine 328 (e.g., by performing a query based upon user input received in relation to input GUI element(s) of siloed child component 310). Similarly, siloed child runtime engine 330 may generate or update a corresponding widget (e.g., bar chart) of siloed child component 312 (e.g., presenting a bar chart widget) based upon data obtained and published by a publisher of siloed runtime engine 330. For example, the publisher of siloed runtime engine 330 can perform a query based upon user input received in relation to input GUI element(s) of siloed child component 312 (not shown to simplify illustration).

Figure 4A:
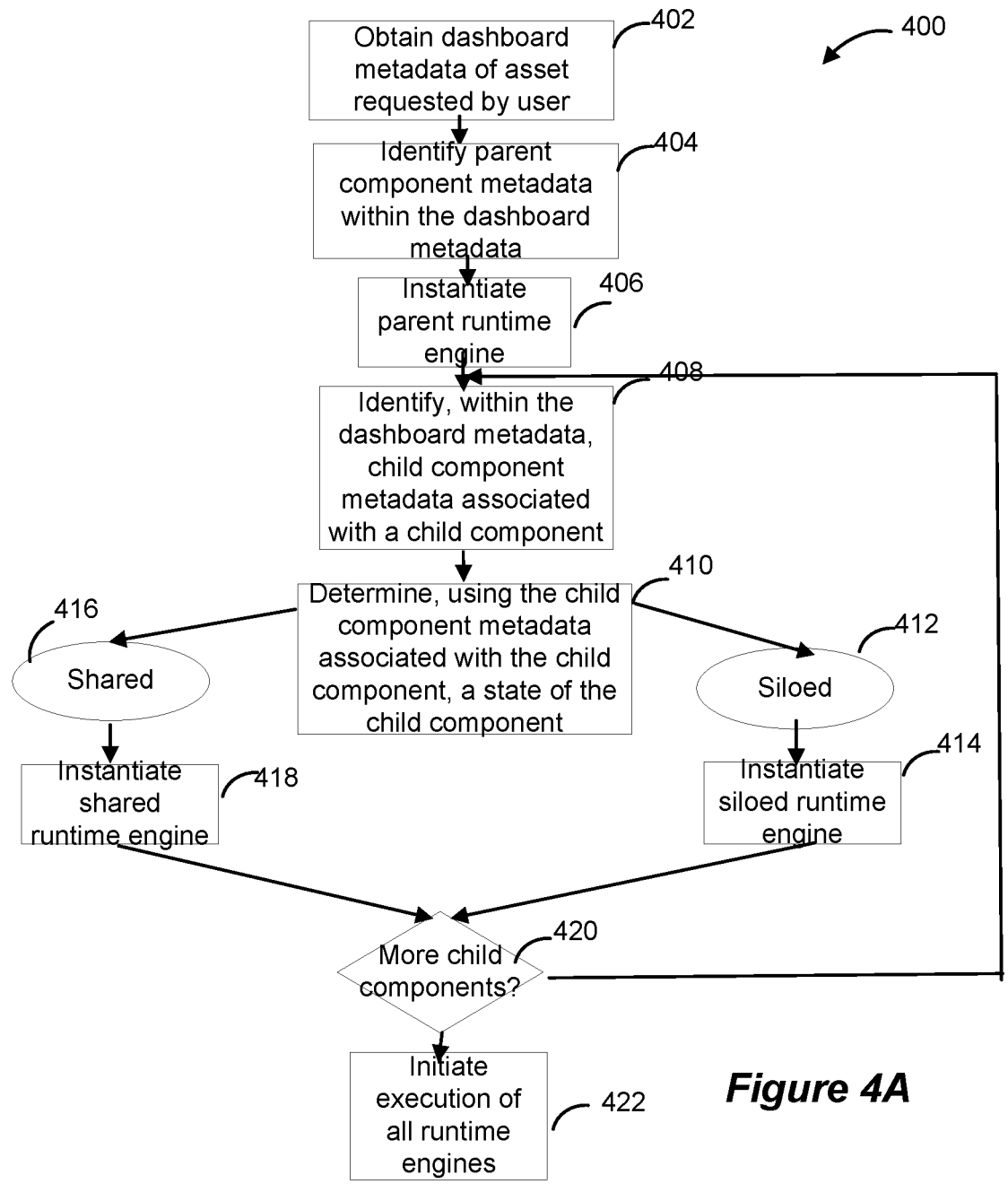
FIG. 4A shows a process flow diagram 400 illustrating a method of orchestrating multiple runtime engines including parent and child runtime engines, in accordance with some implementations.

FIG. 4A shows a process flow diagram 400 illustrating a method of orchestrating multiple runtime engines including parent and child runtime engines, in accordance with some implementations. In some implementations, a client device (e.g., web browser) can request a particular asset, where the asset corresponds to a particular type of dashboard and/or dashboard metadata. For example, a web browser can access a particular web page associated with a particular domain. In some instances, a user can request the asset by selecting a particular dashboard type of a plurality of available dashboard types from a menu, entering the name of a dashboard type via a GUI element provided via the web page, or choosing to access the web page directly.

In response to processing the asset request received from the client device, a server system transmits dashboard metadata associated with the requested asset to the client device (e.g., web browse). In this manner, the client device may obtain dashboard metadata associated with a dashboard identifier (e.g., web address, dashboard type, etc.) at 402.

The dashboard metadata can include at least one file. An example of dashboard metadata will be described in further detail below with reference to FIG. 4B. The client device can store the dashboard metadata in local memory of the client device for subsequent processing by the client device.

Upon obtaining the dashboard metadata, the client device can process the dashboard metadata. More particularly, the client device may parse the dashboard metadata to obtain component metadata associated with each individual component that is to be rendered within a single dashboard GUI. For example, the dashboard metadata may include six different blocks of metadata corresponding to six different components, each of which is to be rendered in a distinct region of the dashboard GUI.

In some implementations, the client device can parse the dashboard metadata to identify keywords within the dashboard metadata. For example, the client device can search for elements of type "component" within the dashboard metadata.

The client device may identify, within the dashboard metadata, component metadata associated with each component. More particularly, the client device can identify, within the dashboard metadata, component metadata associated with a parent component at 404. The client device can instantiate a parent runtime engine using the component metadata associated with the parent component at 406.

The client device may also optimize the flow for efficient initial page load. More particularly, the client device may determine, from the component metadata associated with the parent component, the visible portions of the parent component that are visible on the landing page. The client device may then render those visible portions. For example, the client device may render input GUI elements of the parent component.

In addition, the client device may identify, within the dashboard metadata, child component metadata associated with each of the child components. More particularly, the client device can identify, within the dashboard metadata, child component metadata associated with a child component at 408. The client device may then determine, using the child component metadata associated with the child component, a state of the child component at 410. As described herein, the state of the child component may specify or otherwise indicate a runtime configuration for a runtime engine associated with the child component. A child runtime engine may then be instantiated based, at least in part, on the state associated with the child component.

As shown in this example, if the state indicates that the child component is a siloed child component at 412, a siloed child runtime engine is instantiated at 414. More particularly, the siloed child runtime engine is instantiated such that it is configured to execute independently without communicating with other runtime engines.

In addition, the client device may determine, from the component metadata associated with the siloed child component, the visible portions of the siloed child component that are visible on the landing page. The client device may then render those visible portions. For example, the client device may render input GUI elements of the siloed child component.

Alternatively, if the state indicates that the child component is a shared child runtime engine at 416, a shared child component is instantiated at 418. More particularly, the shared child runtime engine is instantiated such that it is configurable to communicate with the parent runtime engine. In some implementations, the shared child runtime engine is instantiated with a namespace and an argument including an instance of the parent runtime engine. Stated another way, the shared child runtime engine can be generated by instantiating an instance of a wrapper class with an argument of the wrapper class including an instance of the parent runtime engine.

For example, a shared child runtime engine can be instantiated with a namespace, Namespace1. To call a publish method of the shared child runtime engine, the parent runtime engine can call Namespace1.Publish. Similarly, a subscribe method of the shared child runtime engine can be accessed by calling Namespace1.Subscribe.

The client device may also determine, from the component metadata associated with the shared child component, the visible portions of the shared child component that are visible on the landing page. The client device may then render those visible portions. For example, the client device may render a range selector of the shared child component.

If the client device determines that the dashboard metadata includes component metadata for additional components at 420, the client device may continue at 408 for remaining child components.

The client device may initiate execution of all runtime engines such that they simultaneously execute at 422. More particularly, the client device may maintain a runtime map of runtime engine identifiers associated with instances of runtime engines. The client device can call getRuntime( ) with an argument including an identifier of a specific runtime engine, which returns an instance of the specific runtime engine associated with the identifier. The client device can then initiate execution of the specific runtime engine. This process can be repeated for each runtime engine. During runtime, the components of the dashboard GUI may be generated or updated such that the dashboard GUI is rendered via a web page or mobile application.

FIG. 4B shows an example of dashboard metadata 450, in accordance with some implementations. In this example, the web browser of the client device transmits a Hypertext Transfer Protocol (HTTP) request to a web server to access a particular asset, <domain>/dashboards/0FKEE000000k4734AA. In response the web server transmits a HTTP response that includes dashboard metadata 450.

As shown in this example, dashboard metadata 450 can include an identifier (e.g., label) and/or asset name associated with dashboard metadata 450. Dashboard metadata 450 can include component metadata associated with a parent component, as well as component metadata associated with one or more child components.

In some implementations, component metadata includes parameter values associated with parameters associated with a corresponding runtime engine. For example, value(s) of one or more parameters specified in the component metadata can be used during generation (e.g., instantiation) of a corresponding runtime engine. As another example, value(s) of one or more parameters specified in the component metadata can be used by the runtime engine during runtime.

Component metadata associated with a dashboard component can include a type, such as component. During parsing, the client device can use the type to identify all components of a particular dashboard GUI.

In addition, component metadata can identify a source from which computer-readable instructions and/or metadata associated with the component is to be obtained or executed by the corresponding runtime engine. The source can be identified by a name such as "TooltipComponent." The source can identify a file, computer-readable instructions, and/or metadata, which can be applied by the runtime engine to generate or update the corresponding dashboard component (e.g., Tooltip). In some instances, the computer-readable instructions can include a widget application configurable to generate and render a widget (e.g., report).

Component metadata can also specify or otherwise indicate a state of the corresponding dashboard component. The state can designate a runtime configuration of a corresponding runtime engine. In some implementations, the state can include a first value (e.g. TRUE) that indicates that the runtime engine is a shared runtime engine or a second value (e.g., FALSE) that indicates that the runtime engine is a siloed runtime engine. A shared runtime engine can share messages with another runtime engine, as described herein.

In this example, components having a state are referred to as child components. It may be assumed that a parent component shares messages with shared child components but does not share messages with siloed child runtime components.

In some implementations, component metadata designates a specific portion of the dashboard GUI in which the component is to be rendered. For example, the component metadata for a component can indicate or otherwise specify coordinates of the dashboard GUI in which the component is to be rendered.

Figure 4C:
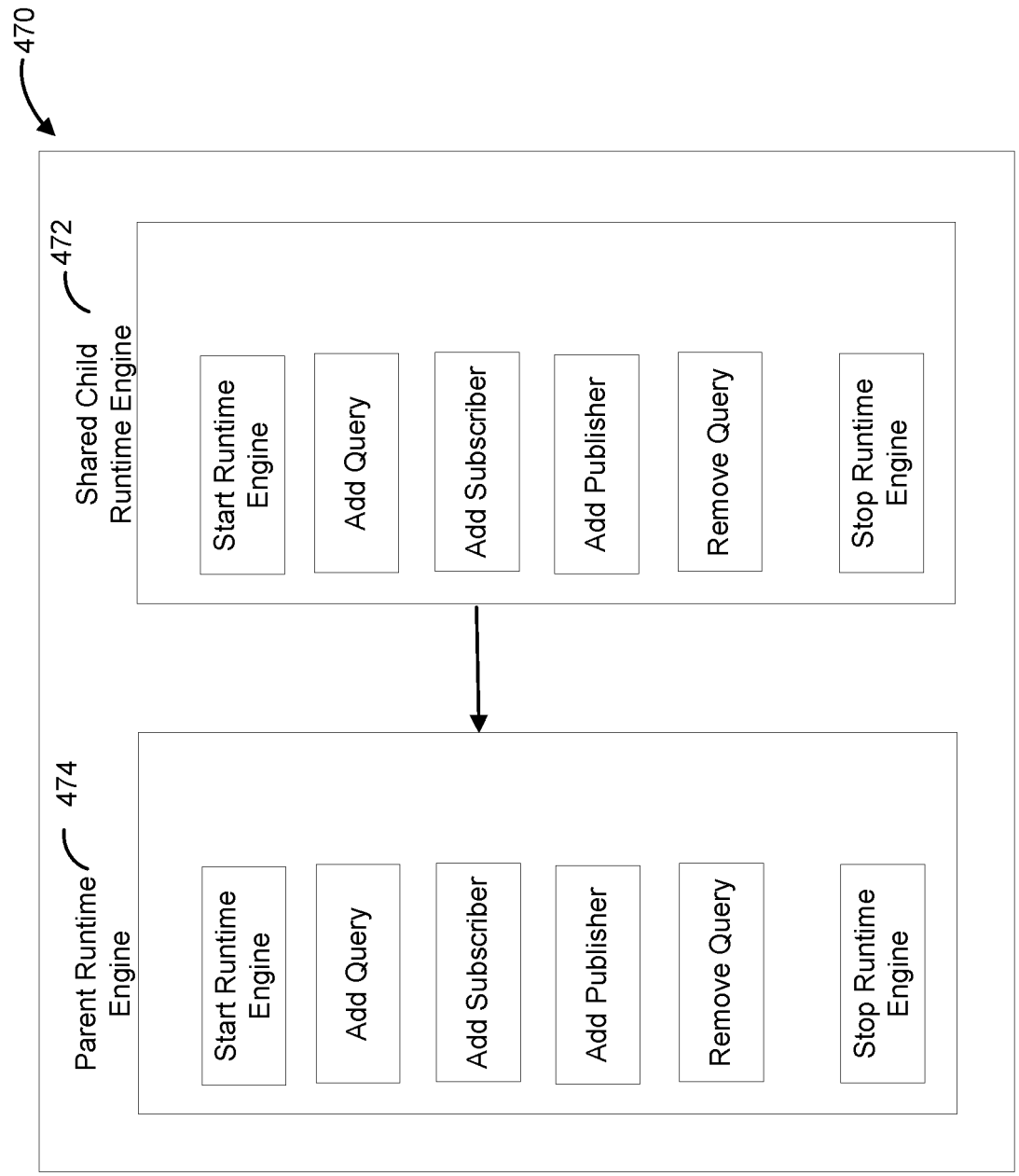
FIG. 4C shows a representation of the relationship between a parent runtime engine and a child runtime engine corresponding to a shared child component of the dashboard GUI, in accordance with some implementations.

FIG. 4C shows a representation 470 of the relationship between a parent runtime engine and a child runtime engine corresponding to a shared child component of the dashboard GUI, in accordance with some implementations. As described herein, shared child runtime engine 472 may encapsulate parent runtime engine 474. When a method of shared child runtime engine 472 is called, this method can automatically call the corresponding method of parent runtime engine 474. More particularly, when shared child runtime engine 472 calls a method of parent runtime engine 474, its namespace identifies the shared child runtime engine 472, enabling parent runtime engine 474 to later respond to publishers or subscribers of shared child runtime engine 472, as appropriate.

In some implementations, if a subscriber calls a subscribe method of shared child runtime engine 472, the subscribe method of shared child runtime engine 472 calls the subscribe method of parent runtime engine 474. For example, if shared child runtime engine 472 operates as a wrapper of parent runtime engine 474, a call to the subscribe method of shared child runtime engine 472 will result in a call to the subscribe method of parent runtime engine 474. A message broker of parent runtime engine 474 can then transmit a message including requested associated with the pertinent event to the subscriber of shared child runtime engine 472.

Similarly, if a publisher calls a publish method of shared child runtime engine 472, the publish method of shared child runtime engine 472 calls the publish method of parent runtime engine 474. The message broker of parent runtime engine 474 can then transmit data obtained from the publisher to a subscriber, as described herein.

Each of the runtime engines 472, 474 can include a set of methods. For example, methods can include, but are not limited to, a subscribe method and a publish method. In addition, each of the runtime engines 472, 474 can provide a set of APIs that enable execution of the corresponding runtime engine to be initiated or stopped.

In accordance with various implementations, a dashboard designer interface enables a user to configure a runtime engine during build time. For example, the dashboard designer interface is configurable to process user commands by detecting an interaction with a user interface element (e.g., button, tab, etc.). In some implementations, the dashboard designer interface enables publishers and subscribers to be configured.

In some implementations, the dashboard designer interface enables a user to create a query associated with a widget or remove a query associated with a widget. Thus, each runtime engine 472, 474 may support the addition or removal of a query via corresponding APIs.

Figure 5:
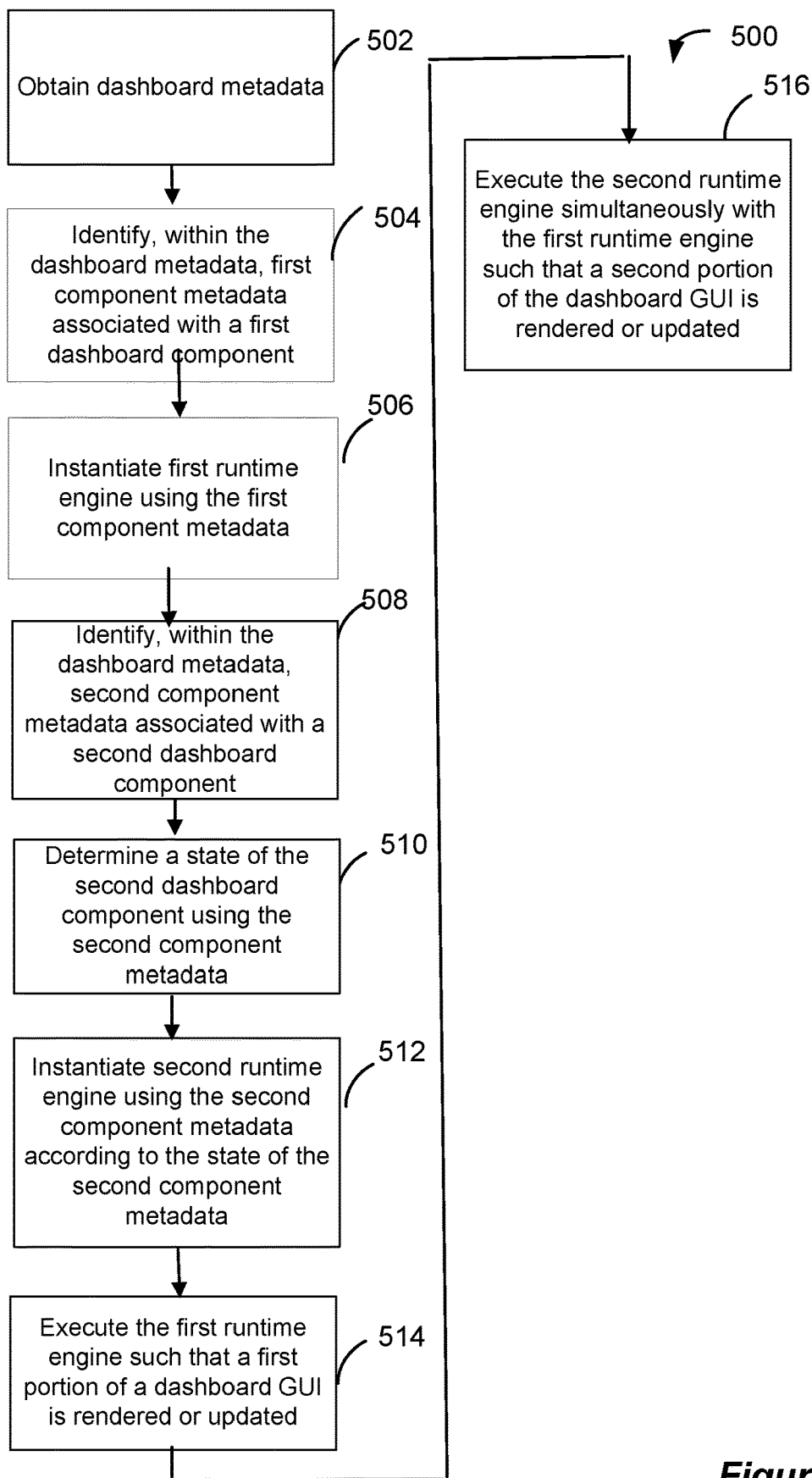
FIG. 5 shows a process flow diagram illustrating a general method of orchestrating multiple runtime engines, in accordance with some implementations.

FIG. 5 shows a process flow diagram illustrating a general method of orchestrating multiple runtime engines, in accordance with some implementations. A client device obtains dashboard metadata associated with a dashboard identifier at 502. As described above, the client device can transmit a request for metadata associated with a dashboard identifier to a server system. For example, the client device may transmit a HTTP request for a uniform resource locator (URL) to the server system and receive a HTTP response from the server system in response to the HTTP request. The HTTP response can include a file including dashboard metadata. The client device may store the dashboard metadata and subsequently process it to identify component metadata associated with each component. For example, the client device may parse the dashboard metadata to identify a keyword such as "component" within the metadata.

The client device identifies, within the dashboard metadata, first component metadata associated with a first dashboard component at 504. For example, the first dashboard component may include a parent component. The first dashboard component may be identified as a parent either implicitly or explicitly within the first component metadata.

In addition, the client device instantiates a first runtime engine using the first component metadata associated with the first dashboard component at 506. For example, the client device may instantiate a parent runtime engine. The first runtime engine can be instantiated according to parameter values specified in the corresponding first component metadata, as described herein.

The client device identifies, within the dashboard metadata, second component metadata associated with a second dashboard component at 508. More particularly, the second dashboard component may include a child component.

The client device determines, using the second component metadata associated with the second dashboard component, a state of the second dashboard component at 510. More particularly, the state of the second dashboard component may specify or indicate a runtime configuration associated with the corresponding runtime engine. The state of the second dashboard component indicates whether messages are to be shared, during runtime, between the first and second runtime engines.

The client device instantiates a second runtime engine using the second component metadata associated with the second dashboard component according to the state of the second dashboard component at 512. More particularly, if the state indicates that the second dashboard component is not a shared component, the second runtime engine is instantiated or otherwise configured such that it operates independently from other runtime engines. Alternatively, if the state indicates that the second dashboard component is a shared component, the second runtime engine can be instantiated with a namespace such that it operates as a wrapper of the first runtime engine. Stated another way, generation of the second runtime engine can include generating an instance of a wrapper class with an argument including the instance of the first runtime engine. The second runtime engine can be instantiated according to parameter values specified in the corresponding second component metadata, as described herein. By using a unique namespace to instantiate the second runtime engine, this enables methods of the wrapper class to be distinguished from methods of other runtime engines having the same name. For example, subscribers and publishers may be identified in association with the namespace. This enables the first runtime engine to transmit requested data to subscribers of the second runtime engine.

In the event that the state of multiple dashboard components indicates that they are "shared," the corresponding shared runtime engines can all be instantiated with the same instance of the first runtime engine. This enables the first runtime engine to communicate with all runtime engines corresponding to shared components.

The client device executes the first runtime engine such that a first portion of a dashboard graphical user interface (GUI) is rendered or updated at 514, where the first portion of the dashboard GUI corresponds to the first dashboard component. In addition, the client device executes the second runtime engine simultaneously with the first runtime engine such that a second portion of the dashboard GUI is rendered or updated at 516, where the second portion of the dashboard GUI corresponds to the second dashboard component. The runtime engines can be executed via multiple processors of the client device such that each runtime engine is executed by a different processor.

During runtime, a publish-subscribe model can be implemented by the runtime engines to facilitate the rendering of widgets using data retrieved in association with queries. In addition, the parent runtime engine can implement a message broker and each siloed runtime engine can implement its own message broker.

In accordance with various implementations, example, a user can initiate a query via interaction with a GUI user interface element (e.g., control element) of a dashboard component associated with a runtime engine. Data obtained from a data source in response to execution of the query can be published via a publish command, method, or process of the runtime engine. For example, a publisher (e.g., publisher code or method) of the runtime engine can transmit, by calling an API corresponding to a publish method of the runtime engine, a publish message including the data and event metadata identifying an event (e.g., topic or other criteria).

In addition, the runtime engine can obtain data for rendering via a widget of the dashboard component via a subscribe command, method, or process of the runtime engine. More particularly, a subscriber (e.g., subscriber code or method) of the runtime engine can transmit, by calling an API corresponding to a subscribe method of the runtime engine, a subscribe message including event metadata identifying an event. In addition, the subscribe message or associated API call can include or otherwise indicate an identifier of the subscriber.

One or more message brokers may facilitate the transmission of data received from publishers to subscribers. More particularly, the brokers can include a first message broker of the first (e.g., parent runtime engine). In addition, the brokers can include a second message broker of the second runtime engine. In some implementations, the second runtime engine does not have its own message broker if it is a shared runtime engine, while the second runtime engine has its own message broker if it is a siloed runtime engine.

A message broker of the parent runtime engine is configurable to process subscribe messages received via the runtime engine and publish messages received by the runtime engine. More particularly, the message broker can use the event metadata to match data received from a publisher with a subscribe request received from a subscriber. Upon identifying an instance of the event (e.g., topic or criteria) in a message received from a publisher, the message broker of the runtime engine can transmit the data to the appropriate subscriber using the subscriber identifier received in the subscribe request. The message broker keeps track of the subscribe requests that have been fulfilled and update its records accordingly. As described herein, the message broker can process messages received from subscribers and publishers of the parent runtime engine, as well as subscribers and publishers of shared child runtime engines.

In accordance with various implementations, the second runtime engine is a shared child runtime engine and the first runtime engine is a parent runtime engine, where the shared child runtime engine operates as a wrapper of the first, parent runtime engine. Since the shared child runtime engine operates as a wrapper of the parent runtime engine, a call by a subscriber of the shared child runtime engine to the subscribe method of the shared child runtime engine causes the subscribe method of the shared runtime engine to call the subscribe method of the parent runtime engine. Similarly, a call by a publisher of the shared child runtime engine to the publish method of the shared runtime engine causes the publish method of the shared runtime engine to call the publish method of the parent runtime engine. Because the identifiers of the methods of the shared runtime engine are "prefixed" with a unique identifier (e.g., namespace), this enables the parent runtime engine to accurately identify the specific publishers and subscribers that initiated the calls to the publish/subscribe methods of the parent runtime engine. In other words, the parent runtime engine can accurately distinguish between publishers and subscribers among the different runtime engines even if the publishers and/or subscribers share the same method names. As a result, data can be shared between a parent runtime engine and any number of shared runtime engines while avoiding conflicts.

Examples of implementations of a publish-subscribe model in relation to a shared child runtime engine and parent runtime engine are described below. In the following description, a first method of the first runtime engine (e.g., parent runtime engine) includes a first subscribe method and a second method of the first runtime engine includes a first publish method, while a first method of the second runtime engine (e.g., shared child runtime engine) includes a second subscribe method and a second method of the second runtime engine includes a second publish method.

Responsive to processing, by the second runtime engine (e.g., shared child runtime engine), a first API call corresponding to the second subscribe method, the second subscribe method calls a second API corresponding to the first subscribe method. The first runtime engine (e.g., parent runtime engine) obtains, from a set of parameters of the second API call, event metadata and an identifier of a subscriber to an event identified by the event metadata. The first runtime engine may subsequently identify an instance of the event within a message that has been published by a publisher (e.g., via the first publish method). Once a message broker of the first runtime engine maps the request for data, received via the first subscribe method, to the instance of the event, the message broker of the first runtime engine transmits data pertaining to the instance of the event to the subscriber. Therefore, the parent runtime engine can share data with a shared child runtime engine in response to a request received via the subscribe method of the parent runtime engine.

Similarly, a shared child runtime engine can share data with the parent runtime engine. More particularly, responsive to processing, by the second runtime engine, a first API call corresponding to the second publish method, the second publish method calls a second API corresponding to the first publish method. The first runtime engine obtains a set of parameters of the first API call, where the set of parameters include data and event metadata identifying an event associated with the data. The first runtime engine identifies a subscriber to the event. For example, the subscriber may be identified by a message broker of the first runtime engine from a message received via a message transmitted by the subscriber via the second subscribe method. The message broker of the first runtime engine then transmits the data to the subscriber.

In some implementations, the second runtime engine is a siloed runtime engine that operates independently from other runtime engines. As described above, the second runtime engine includes a second subscribe method and a second publish method. The second runtime engine may process a first API call corresponding to the second subscribe method, where a first argument of the first API call includes event metadata identifying an event and a second argument of the first API call identifies a subscriber. The second runtime engine identifies an instance of the event. For example, the instance of the event may be identified by a message broker of the second runtime engine based on an instance of an event detected in a message transmitted by a publisher via the second publish method. The message broker of the second runtime engine may then send a message to the subscriber of the event, where the message includes the data associated with the instance of the event and the event metadata.

In some implementations, the first runtime engine is a parent runtime engine. The first runtime engine processes a first API call corresponding to the first subscribe method of the first runtime engine, where the first API call has a first argument including event metadata identifying an event and a second argument identifying a subscriber. The first runtime engine identifies an instance of the event. For example, the instance of the event may be identified by a message broker of the first runtime engine based on a message transmitted by a publisher via the first publish method of the first runtime engine. The message broker of the first runtime engine may then transmit a message to the subscriber of the event, where the message includes the event metadata and data associated with the instance of the event.

Additional information pertaining to dashboards is presented in U.S. patent application Ser. No. 15/603,303, filed May 23, 2017, and entitled "Modular Runtime Environment," the contents of which are hereby incorporated by reference in their entirety.

Some but not all of the techniques described or referenced herein are implemented using or in conjunction with a database system. Salesforce.com, inc. is a provider of customer relationship management (CRM) services and other database management services, which can be accessed and used in conjunction with the techniques disclosed herein in some implementations. In some but not all implementations, services can be provided in a cloud computing environment, for example, in the context of a multi-tenant database system. Thus, some of the disclosed techniques can be implemented without having to install software locally, that is, on computing devices of users interacting with services available through the cloud. Some of the disclosed techniques can be implemented via an application installed on computing devices of users.

Information stored in a database record can include various types of data including character-based data, audio data, image data, animated images, and/or video data. A database record can store one or more files, which can include text, presentations, documents, multimedia files, and the like. Data retrieved from a database can be presented via a computing device. For example, visual data can be displayed in a graphical user interface (GUI) on a display device such as the display of the computing device. In some but not all implementations, the disclosed methods, apparatus, systems, and computer program products may be configured or designed for use in a multi-tenant database environment.

The term "multi-tenant database system" generally refers to those systems in which various elements of hardware and/or software of a database system may be shared by one or more customers. For example, a given application server may simultaneously process requests for a great number of customers, and a given database table may store rows of data such as feed items for a potentially much greater number of customers.

An example of a "user profile" or "user's profile" is a database object or set of objects configured to store and maintain data about a given user of a social networking system and/or database system. The data can include general information, such as name, title, phone number, a photo, a biographical summary, and a status, e.g., text describing what the user is currently doing. Where there are multiple tenants, a user is typically associated with a particular tenant. For example, a user could be a salesperson of a company, which is a tenant of the database system that provides a database service.

The term "record" generally refers to a data entity having fields with values and stored in database system. An example of a record is an instance of a data object created by a user of the database service, for example, in the form of a CRM record about a particular (actual or potential) business relationship or project. The record can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

Some non-limiting examples of systems, apparatus, and methods are described below for implementing database systems and enterprise level social networking systems in conjunction with the disclosed techniques. Such implementations can provide more efficient use of a database system. For instance, a user of a database system may not easily know when important information in the database has changed, e.g., about a project or client. Such implementations can provide feed tracked updates about such changes and other events, thereby keeping users informed.

Figure 6A:
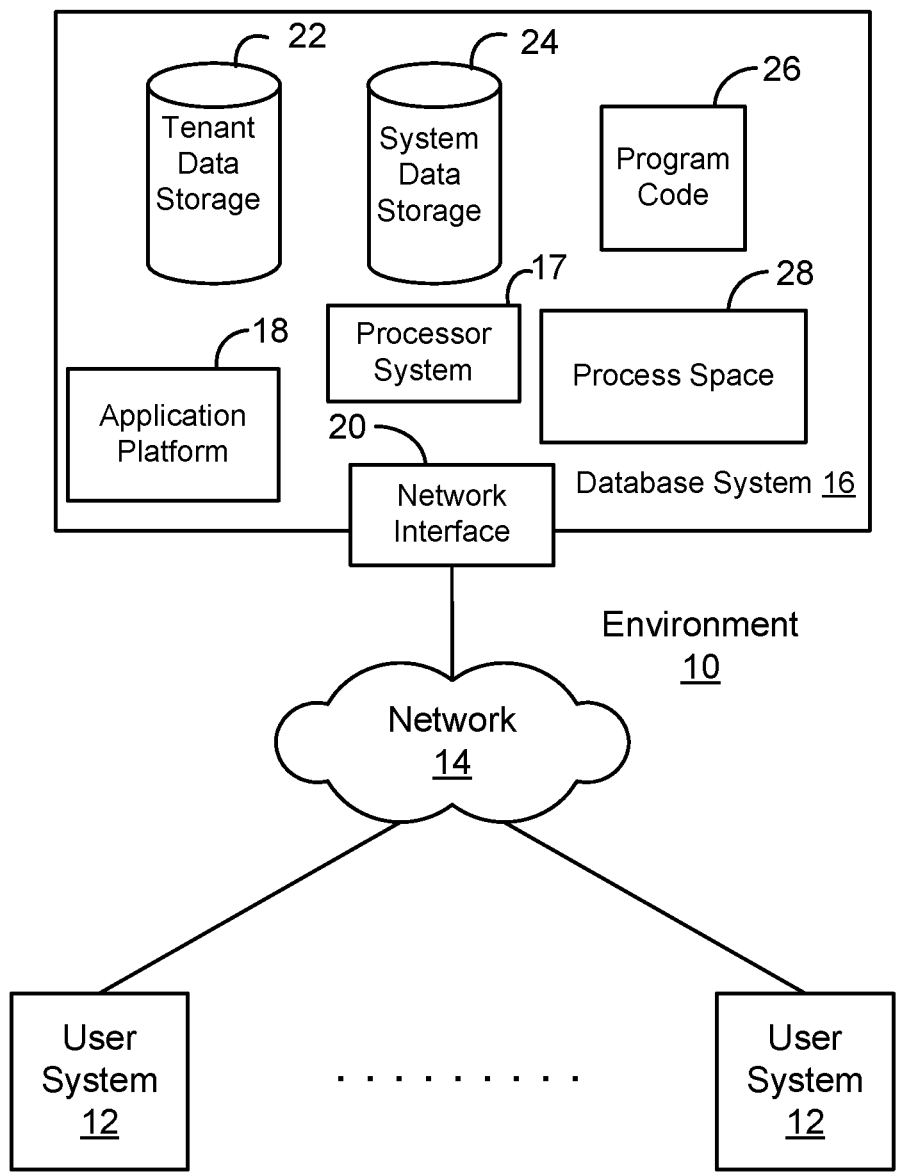
FIG. 6A shows a block diagram of an example of an environment 10 in which an on-demand database service can be used in accordance with some implementations.

FIG. 6A shows a block diagram of an example of an environment 10 in which an on-demand database service exists and can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

A user system 12 may be implemented as any computing device(s) or other data processing apparatus such as a machine or system used by a user to access a database system 16. For example, any of user systems 12 can be a handheld and/or portable computing device such as a mobile phone, a smartphone, a laptop computer, or a tablet. Other examples of a user system include computing devices such as a work station and/or a network of computing devices. As illustrated in FIG. 6A (and in more detail in FIG. 6B) user systems 12 might interact via a network 14 with an on-demand database service, which is implemented in the example of FIG. 6A as database system 16.

An on-demand database service, implemented using system 16 by way of example, is a service that is made available to users who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, when a salesperson is using a particular user system 12 to interact with system 16, the user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the Internet. The Internet will be used in many of the examples herein. However, it should be understood that the networks that the present implementations might use are not so limited.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 6A, implements a web-based CRM system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 7A:
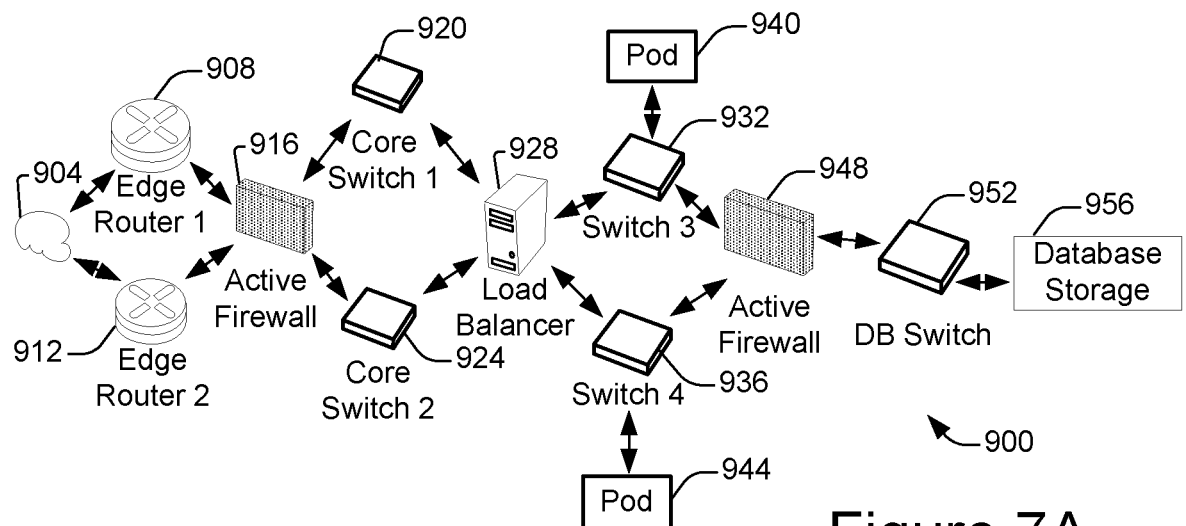
FIG. 7A shows a system diagram of an example of architectural components of an on-demand database service environment 900, in accordance with some implementations.
Figure 7B:
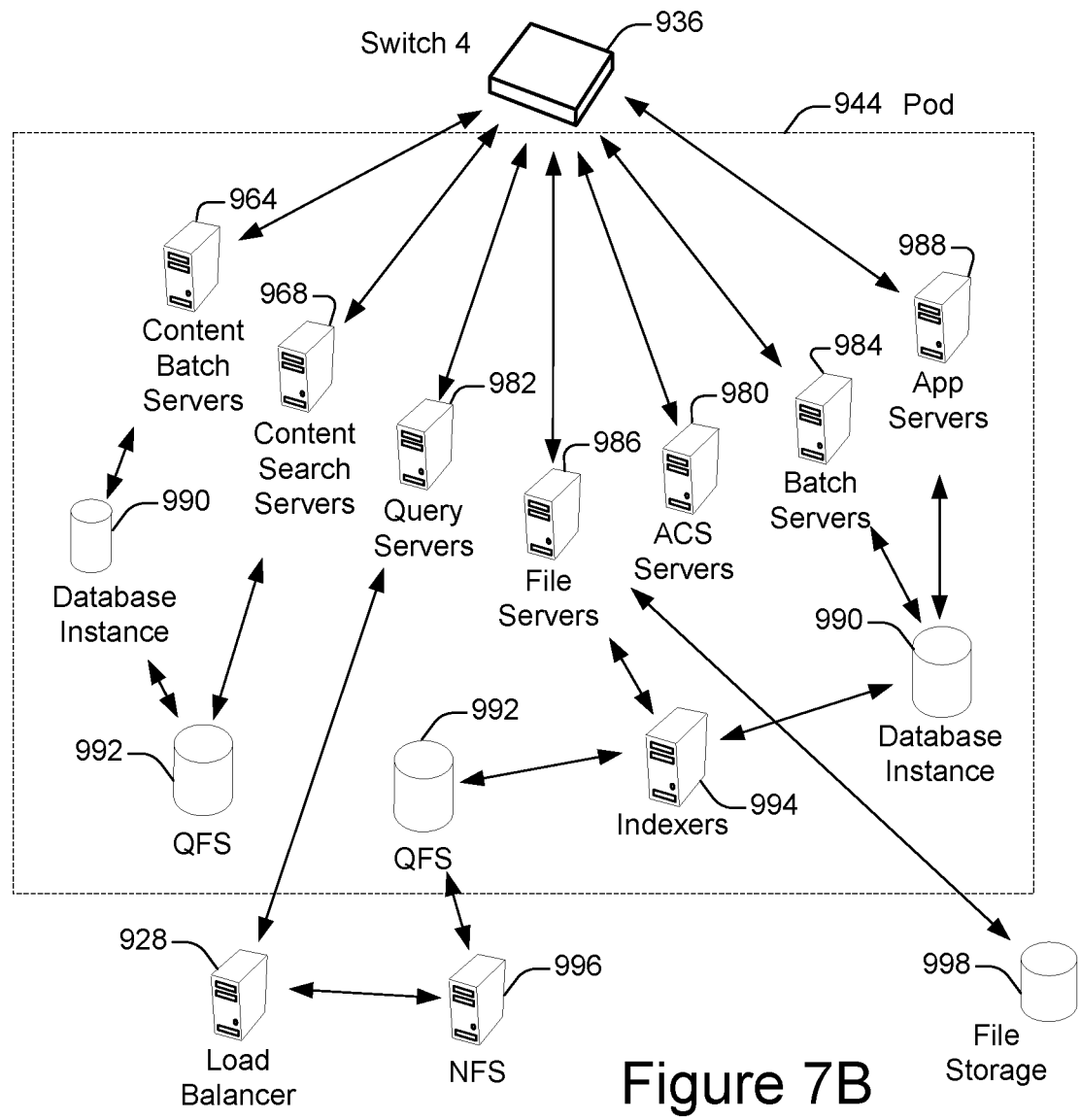
FIG. 7B shows a system diagram further illustrating an example of architectural components of an on-demand database service environment, in accordance with some implementations.

One arrangement for elements of system 16 is shown in FIGS. 7A and 7B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 6A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a GUI provided by the browser on a display (e.g., a monitor screen, LCD display, OLED display, etc.) of the computing device in conjunction with pages, forms, applications and other information provided by system 16 or other systems or servers. Thus, "display device" as used herein can refer to a display of a computer system such as a monitor or touch-screen display, and can refer to any computing device having display capabilities such as a desktop computer, laptop, tablet, smartphone, a television set-top box, or wearable device such Google Glass® or other human body-mounted display apparatus. For example, the display device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C. C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to one type of computing device such as a system including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

Figure 6B:
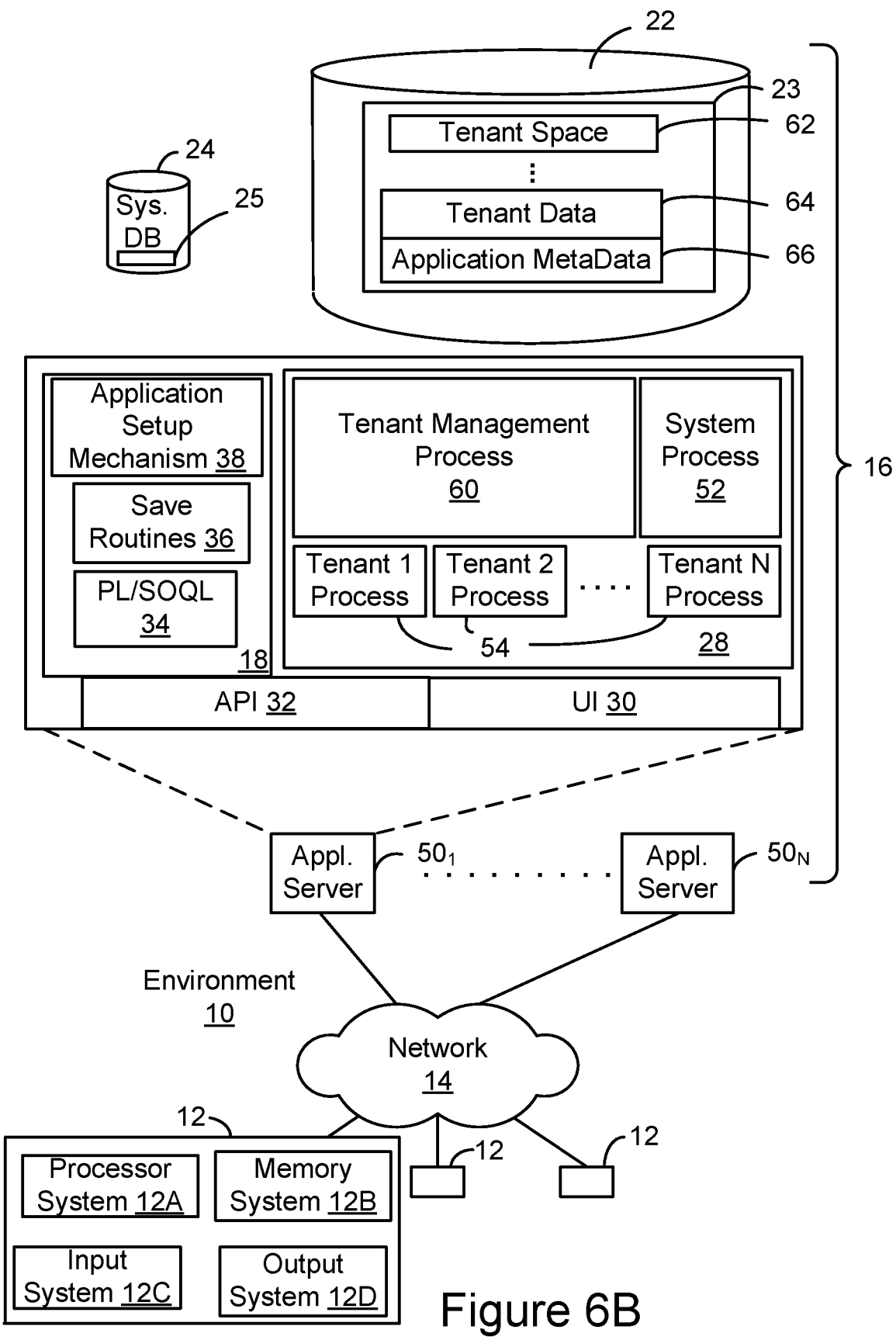
FIG. 6B shows a block diagram of an example of some implementations of elements of FIG. 6A and various possible interconnections between these elements.

FIG. 6B shows a block diagram of an example of some implementations of elements of FIG. 6A and various possible interconnections between these elements. That is, FIG. 6B also illustrates environment 10. However, in FIG. 6B elements of system 16 and various interconnections in some implementations are further illustrated. FIG. 6B shows that user system 12 may include processor system 12A, memory system 12B, input system 12C, and output system 12D. FIG. 6B shows network 14 and system 16. FIG. 6B also shows that system 16 may include tenant data storage 22, tenant data 23, system data storage 24, system data 25, User Interface (UI) 30, Application Program Interface (API) 32, PL/SOQL 34, save routines 36, application setup mechanism 38, application servers $50_1$-$50_N$, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 6A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 6B, system 16 may include a network interface 20 (of FIG. 6A) implemented as a set of application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle® databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server $50_1$ might be coupled via the network 14 (e.g., the Internet), another application server $50_{N-1}$ might be coupled via a direct network link, and another application server $50_N$ might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

FIG. 7A shows a system diagram of an example of architectural components of an on-demand database service environment 900, in accordance with some implementations. A client machine located in the cloud 904, generally referring to one or more networks in combination, as described herein, may communicate with the on-demand database service environment via one or more edge routers 908 and 912. A client machine can be any of the examples of user systems 12 described above. The edge routers may communicate with one or more core switches 920 and 924 via firewall 916. The core switches may communicate with a load balancer 928, which may distribute server load over different pods, such as the pods 940 and 944. The pods 940 and 944, which may each include one or more servers and/or other computing resources, may perform data processing and other operations used to provide on-demand services. Communication with the pods may be conducted via pod switches 932 and 936. Components of the on-demand database service environment may communicate with a database storage 956 via a database firewall 948 and a database switch 952.

As shown in FIGS. 7A and 7B, accessing an on-demand database service environment may involve communications transmitted among a variety of different hardware and/or software components. Further, the on-demand database service environment 900 is a simplified representation of an actual on-demand database service environment. For example, while only one or two devices of each type are shown in FIGS. 7A and 7B, some implementations of an on-demand database service environment may include anywhere from one to many devices of each type. Also, the on-demand database service environment need not include each device shown in FIGS. 7A and 7B, or may include additional devices not shown in FIGS. 7A and 7B.

Moreover, one or more of the devices in the on-demand database service environment 900 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 904 is intended to refer to a data network or combination of data networks, often including the Internet. Client machines located in the cloud 904 may communicate with the on-demand database service environment to access services provided by the on-demand database service environment. For example, client machines may access the on-demand database service environment to retrieve, store, edit, and/or process information.

In some implementations, the edge routers 908 and 912 route packets between the cloud 904 and other components of the on-demand database service environment 900. The edge routers 908 and 912 may employ the Border Gateway Protocol (BGP). The BGP is the core routing protocol of the Internet. The edge routers 908 and 912 may maintain a table of IP networks or 'prefixes', which designate network reachability among autonomous systems on the Internet.

In one or more implementations, the firewall 916 may protect the inner components of the on-demand database service environment 900 from Internet traffic. The firewall 916 may block, permit, or deny access to the inner components of the on-demand database service environment 900 based upon a set of rules and other criteria. The firewall 916 may act as one or more of a packet filter, an application gateway, a stateful filter, a proxy server, or any other type of firewall.

In some implementations, the core switches 920 and 924 are high-capacity switches that transfer packets within the on-demand database service environment 900. The core switches 920 and 924 may be configured as network bridges that quickly route data between different components within the on-demand database service environment. In some implementations, the use of two or more core switches 920 and 924 may provide redundancy and/or reduced latency.

In some implementations, the pods 940 and 944 may perform the core data processing and service functions provided by the on-demand database service environment. Each pod may include various types of hardware and/or software computing resources. An example of the pod architecture is discussed in greater detail with reference to FIG. 7B.

In some implementations, communication between the pods 940 and 944 may be conducted via the pod switches 932 and 936. The pod switches 932 and 936 may facilitate communication between the pods 940 and 944 and client machines located in the cloud 904, for example via core switches 920 and 924. Also, the pod switches 932 and 936 may facilitate communication between the pods 940 and 944 and the database storage 956.

In some implementations, the load balancer 928 may distribute workload between the pods 940 and 944. Balancing the on-demand service requests between the pods may assist in improving the use of resources, increasing throughput, reducing response times, and/or reducing overhead. The load balancer 928 may include multilayer switches to analyze and forward traffic.

In some implementations, access to the database storage 956 may be guarded by a database firewall 948. The database firewall 948 may act as a computer application firewall operating at the database application layer of a protocol stack. The database firewall 948 may protect the database storage 956 from application attacks such as structure query language (SQL) injection, database rootkits, and unauthorized information disclosure.

In some implementations, the database firewall 948 may include a host using one or more forms of reverse proxy services to proxy traffic before passing it to a gateway router. The database firewall 948 may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some implementations, communication with the database storage 956 may be conducted via the database switch 952. The multi-tenant database storage 956 may include more than one hardware and/or software components for handling database queries. Accordingly, the database switch 952 may direct database queries transmitted by other components of the on-demand database service environment (e.g., the pods 940 and 944) to the correct components within the database storage 956.

In some implementations, the database storage 956 is an on-demand database system shared by many different organizations. The on-demand database service may employ a multi-tenant approach, a virtualized approach, or any other type of database approach. On-demand database services are discussed in greater detail with reference to FIGS. 7A and 7B.

FIG. 7B shows a system diagram further illustrating an example of architectural components of an on-demand database service environment, in accordance with some implementations. The pod 944 may be used to render services to a user of the on-demand database service environment 900. In some implementations, each pod may include a variety of servers and/or other systems. The pod 944 includes one or more content batch servers 964, content search servers 968, query servers 982, file servers 986, access control system (ACS) servers 980, batch servers 984, and app servers 988. Also, the pod 944 includes database instances 990, quick file systems (QFS) 992, and indexers 994. In one or more implementations, some or all communication between the servers in the pod 944 may be transmitted via the switch 936.

The content batch servers 964 may handle requests internal to the pod. These requests may be long-running and/or not tied to a particular customer. For example, the content batch servers 964 may handle requests related to log mining, cleanup work, and maintenance tasks.

The content search servers 968 may provide query and indexer functions. For example, the functions provided by the content search servers 968 may allow users to search through content stored in the on-demand database service environment.

The file servers 986 may manage requests for information stored in the file storage 998. The file storage 998 may store information such as documents, images, and basic large objects (BLOBs). By managing requests for information using the file servers 986, the image footprint on the database may be reduced.

The query servers 982 may be used to retrieve information from one or more file systems. For example, the query system 982 may receive requests for information from the app servers 988 and then transmit information queries to the NFS 996 located outside the pod.

The pod 944 may share a database instance 990 configured as a multi-tenant environment in which different organizations share access to the same database. Additionally, services rendered by the pod 944 may call upon various hardware and/or software resources. In some implementations, the ACS servers 980 may control access to data, hardware resources, or software resources.

In some implementations, the batch servers 984 may process batch jobs, which are used to run tasks at specified times. Thus, the batch servers 984 may transmit instructions to other servers, such as the app servers 988, to trigger the batch jobs.

In some implementations, the QFS 992 may be an open source file system available from Sun Microsystems® of Santa Clara, California. The QFS may serve as a rapid-access file system for storing and accessing information available within the pod 944. The QFS 992 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 968 and/or indexers 994 to identify, retrieve, move, and/or update data stored in the network file systems 996 and/or other storage systems.

In some implementations, one or more query servers 982 may communicate with the NFS 996 to retrieve and/or update information stored outside of the pod 944. The NFS 996 may allow servers located in the pod 944 to access information to access files over a network in a manner similar to how local storage is accessed.

In some implementations, queries from the query servers 922 may be transmitted to the NFS 996 via the load balancer 928, which may distribute resource requests over various resources available in the on-demand database service environment. The NFS 996 may also communicate with the QFS 992 to update the information stored on the NFS 996 and/or to provide information to the QFS 992 for use by servers located within the pod 944.

In some implementations, the pod may include one or more database instances 990. The database instance 990 may transmit information to the QFS 992. When information is transmitted to the QFS, it may be available for use by servers within the pod 944 without using an additional database call.

In some implementations, database information may be transmitted to the indexer 994. Indexer 994 may provide an index of information available in the database 990 and/or QFS 992. The index information may be provided to file servers 986 and/or the QFS 992.

In some implementations, one or more application servers or other servers described above with reference to FIGS. 7A and 7B include a hardware and/or software framework configurable to execute procedures using programs, routines, scripts, etc. Thus, in some implementations, one or more of application servers $50_1$-$50_N$ of FIG. 7B can be configured to initiate performance of one or more of the operations described above by instructing another computing device to perform an operation. In some implementations, one or more application servers $50_1$-$50_N$ carry out, either partially or entirely, one or more of the disclosed operations. In some implementations, app servers 988 of FIG. 7B support the construction of applications provided by the on-demand database service environment 900 via the pod 944. Thus, an app server 988 may include a hardware and/or software framework configurable to execute procedures to partially or entirely carry out or instruct another computing device to carry out one or more operations disclosed herein. In alternative implementations, two or more app servers 988 may cooperate to perform or cause performance of such operations. Any of the databases and other storage facilities described above with reference to FIGS. 6A, 6B, 7A and 7B can be configured to store lists, articles, documents, records, files, and other objects for implementing the operations described above. For instance, lists of available communication channels associated with share actions for sharing a type of data item can be maintained in tenant data storage 22 and/or system data storage 24 of FIGS. 7A and 7B. By the same token, lists of default or designated channels for particular share actions can be maintained in storage 22 and/or storage 24. In some other implementations, rather than storing one or more lists, articles, documents, records, and/or files, the databases and other storage facilities described above can store pointers to the lists, articles, documents, records, and/or files, which may instead be stored in other repositories external to the systems and environments described above with reference to FIGS. 6A, 6B, 7A and 7B.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of the implementations claimed.

It should be understood that some of the disclosed implementations can be embodied in the form of control logic using hardware and/or computer software in a modular or integrated manner. Other ways and/or methods are possible using hardware and a combination of hardware and software.

Any of the disclosed implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to: magnetic media such as hard disks, floppy disks, and magnetic tape; optical media such as flash memory, compact disk (CD) or digital versatile disk (DVD); magneto-optical media; and hardware devices specially configured to store program instructions, such as read-only memory (ROM) devices and random access memory (RAM) devices. A computer-readable medium may be any combination of such storage devices.

Any of the operations and techniques described in this application may be implemented as software code to be executed by a processor using any suitable computer language such as, for example, Java, C++ or Perl using, for example, object-oriented techniques. The software code may be stored as a series of instructions or commands on a computer-readable medium. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system or computing device may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A method, comprising:
    obtaining dashboard metadata associated with a dashboard identifier;
    identifying, within the dashboard metadata, first component metadata associated with a first dashboard component;
    instantiating a first runtime engine using the first component metadata associated with the first dashboard component;
    identifying, within the dashboard metadata, second component metadata associated with a second dashboard component;
    determining, using the second component metadata associated with the second dashboard component, a state of the second dashboard component;
    instantiating a second runtime engine using the second component metadata associated with the second dashboard component according to the state of the second dashboard component;
    executing the first runtime engine such that a first portion of a dashboard graphical user interface (GUI) is rendered or updated, the first portion of the dashboard GUI corresponding to the first dashboard component; and
    executing the second runtime engine simultaneously with the first runtime engine such that a second portion of the dashboard GUI is rendered or updated, the second portion of the dashboard GUI corresponding to the second dashboard component.

2. The method of claim 1, the state of the second dashboard component indicating a runtime configuration of the second runtime engine in relation to the first runtime engine, wherein instantiating the second runtime engine associated with the second dashboard component comprises:
    instantiating the second runtime engine with a namespace and an argument including an instance of the parent runtime engine.

3. The method of claim 1, the state of the second dashboard component indicating a runtime configuration of the second runtime engine in relation to the first runtime engine, wherein instantiating the second runtime engine associated with the second dashboard component comprises:
    generating, using a namespace, an instance of a wrapper class with an argument of the wrapper class including an instance of the first runtime engine.

4. The method of claim 1, a first method of the first runtime engine being a first subscribe method and a second method of the first runtime engine being a first publish method, a first method of the second runtime engine being a second subscribe method and a second method of the second runtime engine being a second publish method, the method further comprising:
    responsive to processing, by the second runtime engine, a first application programming interface (API) call corresponding to the second subscribe method, calling, via the second subscribe method, a second API corresponding to the first subscribe method;
    obtaining, by the first runtime engine from a set of parameters of the second API call, event metadata and an identifier of a subscriber to an event identified by the event metadata; and
    transmitting, by the first runtime engine to the subscriber, data pertaining to an instance of the event to the subscriber.

5. The method of claim 1, a first method of the first runtime engine being a first subscribe method and a second method of the first runtime engine being a first publish method, a first method of the second runtime engine being a second subscribe method and a second method of the second runtime engine being a second publish method, the method further comprising:
    responsive to processing, by the second runtime engine, a first application programming interface (API) call corresponding to the second publish method, calling, via the second publish method, a second API corresponding to the first publish method;

obtaining, by the first runtime engine from a set of parameters of the first API call, data and event metadata identifying an event associated with the data;

identifying, by the first runtime engine, a subscriber to the event; and transmitting, by the first runtime engine, the data to the subscriber.

6. The method of claim 1, a first method of the second runtime engine being a subscribe method and a second method of the second runtime engine being a publish method, the method further comprising:

processing, by the second runtime engine, a first application programming interface (API) call corresponding to the first method of the second runtime engine, the first API call having a first argument including event metadata identifying an event and including a second argument identifying a subscriber;

identifying, by the second runtime engine, an instance of the event; and transmitting, by the second runtime engine, a message to a subscriber of the event, the message including data associated with the instance of the event and the event metadata.

7. The method of claim 1, a first method of the first runtime engine being a subscribe method and a second method of the first runtime engine being a publish method, the method further comprising:

processing, by the first runtime engine, a first application programming interface (API) call corresponding to the first method of the first runtime engine, the first API call having a first argument including event metadata identifying an event and including a second argument identifying a subscriber;

identifying, by the first runtime engine, an instance of the event; and transmitting, by the first runtime engine, a message to the subscriber of the event, the message including data associated with the instance of the event and the event metadata.

8. The method of claim 1, further comprising:

transmitting a request for metadata associated with a dashboard to a server system;

wherein obtaining the metadata associated with the dashboard includes receiving the metadata associated with the dashboard responsive to the request.

9. A computer program product comprising computer-readable program code capable of being executed by one or more processors when retrieved from a non-transitory computer-readable medium, the program code comprising computer-readable instructions configurable to cause:

obtaining dashboard metadata associated with a dashboard identifier;

identifying, within the dashboard metadata, first component metadata associated with a first dashboard component;

instantiating a first runtime engine using the first component metadata associated with the first dashboard component;

identifying, within the dashboard metadata, second component metadata associated with a second dashboard component;

determining, using the second component metadata associated with the second dashboard component, a state of the second dashboard component;

instantiating a second runtime engine using the second component metadata associated with the second dashboard component according to the state of the second dashboard component;

executing the first runtime engine such that a first portion of a dashboard graphical user interface (GUI) is rendered or updated, the first portion of the dashboard GUI corresponding to the first dashboard component; and executing the second runtime engine simultaneously with the first runtime engine such that a second portion of the dashboard GUI is rendered or updated, the second portion of the dashboard GUI corresponding to the second dashboard component.

10. The computer program product of claim 9, the state of the second dashboard component indicating a runtime configuration of the second runtime engine in relation to the first runtime engine, wherein instantiating the second runtime engine associated with the second dashboard component comprises:

instantiating the second runtime engine with a namespace and an argument including an instance of the parent runtime engine.

11. The computer program product of claim 9, the state of the second dashboard component indicating a runtime configuration of the second runtime engine in relation to the first runtime engine, wherein instantiating the second runtime engine associated with the second dashboard component comprises:

generating, using a namespace, an instance of a wrapper class with an argument of the wrapper class including an instance of the first runtime engine.

12. The computer program product of claim 9, a first method of the first runtime engine being a first subscribe method and a second method of the first runtime engine being a first publish method, a first method of the second runtime engine being a second subscribe method and a second method of the second runtime engine being a second publish method, the program code comprising computer-readable instructions further configurable to cause:

responsive to processing, by the second runtime engine, a first application programming interface (API) call corresponding to the second subscribe method, calling, via the second subscribe method, a second API corresponding to the first subscribe method;

obtaining, by the first runtime engine from a set of parameters of the second API call, event metadata and an identifier of a subscriber to an event identified by the event metadata; and transmitting, by the first runtime engine to the subscriber, data pertaining to an instance of the event to the subscriber.

13. The computer program product of claim 9, a first method of the first runtime engine being a first subscribe method and a second method of the first runtime engine being a first publish method, a first method of the second runtime engine being a second subscribe method and a second method of the second runtime engine being a second publish method, the program code comprising computer-readable instructions further configurable to cause:

responsive to processing, by the second runtime engine, a first application programming interface (API) call corresponding to the second publish method, calling, via the second publish method, a second API corresponding to the first publish method;

obtaining, by the first runtime engine from a set of parameters of the first API call, data and event metadata identifying an event associated with the data;

identifying, by the first runtime engine, a subscriber to the event; and transmitting, by the first runtime engine, the data to the subscriber.

14. A computing system, comprising:
a processor; and
a memory, the computing device configurable to cause:
obtaining dashboard metadata associated with a dashboard identifier;
identifying, within the dashboard metadata, first component metadata associated with a first dashboard component;
instantiating a first runtime engine using the first component metadata associated with the first dashboard component;
identifying, within the dashboard metadata, second component metadata associated with a second dashboard component;
determining, using the second component metadata associated with the second dashboard component, a state of the second dashboard component;
instantiating a second runtime engine using the second component metadata associated with the second dashboard component according to the state of the second dashboard component;
executing the first runtime engine such that a first portion of a dashboard graphical user interface (GUI) is rendered or updated, the first portion of the dashboard GUI corresponding to the first dashboard component; and
executing the second runtime engine simultaneously with the first runtime engine such that a second portion of the dashboard GUI is rendered or updated, the second portion of the dashboard GUI corresponding to the second dashboard component.

15. The computing system of claim 14, the state of the second dashboard component indicating a runtime configuration of the second runtime engine in relation to the first runtime engine, wherein instantiating the second runtime engine associated with the second dashboard component comprises:
instantiating the second runtime engine with a namespace and an argument including an instance of the parent runtime engine.

16. The computing system of claim 14, the state of the second dashboard component indicating a runtime configuration of the second runtime engine in relation to the first runtime engine, wherein instantiating the second runtime engine associated with the second dashboard component comprises:
generating, using a namespace, an instance of a wrapper class with an argument of the wrapper class including an instance of the first runtime engine.

17. The computing system of claim 14, a first method of the first runtime engine being a first subscribe method and a second method of the first runtime engine being a first publish method, a first method of the second runtime engine being a second subscribe method and a second method of the second runtime engine being a second publish method, the computing system further configurable to cause:
responsive to processing, by the second runtime engine, a first application programming interface (API) call corresponding to the second subscribe method, calling, via the second subscribe method, a second API corresponding to the first subscribe method;
obtaining, by the first runtime engine from a set of parameters of the second API call, event metadata and an identifier of a subscriber to an event identified by the event metadata; and
transmitting, by the first runtime engine to the subscriber, data pertaining to an instance of the event to the subscriber.

18. The computing system of claim 14, a first method of the first runtime engine being a first subscribe method and a second method of the first runtime engine being a first publish method, a first method of the second runtime engine being a second subscribe method and a second method of the second runtime engine being a second publish method, the computing system further configurable to cause:
responsive to processing, by the second runtime engine, a first application programming interface (API) call corresponding to the second publish method, calling, via the second publish method, a second API corresponding to the first publish method;
obtaining, by the first runtime engine from a set of parameters of the first API call, data and event metadata identifying an event associated with the data;
identifying, by the first runtime engine, a subscriber to the event; and
transmitting, by the first runtime engine, the data to the subscriber.

19. The computing system of claim 14, a first method of the second runtime engine being a subscribe method and a second method of the second runtime engine being a publish method, the computing system further configurable to cause:
processing, by the second runtime engine, a first application programming interface (API) call corresponding to the first method of the second runtime engine, the first API call having a first argument including event metadata identifying an event and including a second argument identifying a subscriber;
identifying, by the second runtime engine, an instance of the event; and
transmitting, by the second runtime engine, a message to a subscriber of the event, the message including data associated with the instance of the event and the event metadata.

20. The computing system of claim 14, a first method of the first runtime engine being a subscribe method and a second method of the first runtime engine being a publish method, the computing system further configurable to cause:
processing, by the first runtime engine, a first application programming interface (API) call corresponding to the first method of the first runtime engine, the first API call having a first argument including event metadata identifying an event and including a second argument identifying a subscriber;
identifying, by the first runtime engine, an instance of the event; and
transmitting, by the first runtime engine, a message to the subscriber of the event, the message including data associated with the instance of the event and the event metadata.

* * * * *